(12) United States Patent
Collins

(10) Patent No.: US 7,423,394 B2
(45) Date of Patent: Sep. 9, 2008

(54) SINGLE-SENSOR BASED COMMUTATION OF MULTI-PHASE MOTOR

(75) Inventor: Mark E. Collins, Webster, NH (US)

(73) Assignee: IntelaSense, LLC, Webster, NH (US)

( * ) Notice: Subject to any disclaimer, the term of this patent is extended or adjusted under 35 U.S.C. 154(b) by 149 days.

(21) Appl. No.: 11/482,596

(22) Filed: Jul. 7, 2006

(65) Prior Publication Data

US 2007/0159123 A1    Jul. 12, 2007

Related U.S. Application Data

(60) Provisional application No. 60/758,421, filed on Jan. 12, 2006.

(51) Int. Cl.
*H02P 6/00* (2006.01)
(52) U.S. Cl. .................. 318/400.01; 318/400.14; 318/400.38; 318/400.03
(58) Field of Classification Search ............ 318/400.01, 318/400.14, 400.27, 400.29, 400.38, 400.03
See application file for complete search history.

(56) References Cited

U.S. PATENT DOCUMENTS

| 4,250,435 | A | * | 2/1981 | Alley et al. | ............ | 318/400.03 |
|---|---|---|---|---|---|---|
| 5,012,166 | A | * | 4/1991 | Ushijima et al. | ....... | 318/400.13 |
| 5,659,217 | A | | 8/1997 | Petersen | | |
| 5,850,130 | A | * | 12/1998 | Fujisaki et al. | ........... | 318/400.2 |
| 6,118,244 | A | * | 9/2000 | Steinbusch | .................. | 318/603 |
| 6,441,530 | B1 | | 8/2002 | Petersen | | |
| 6,617,740 | B2 | | 9/2003 | Petersen | | |
| 6,617,747 | B1 | | 9/2003 | Petersen | | |
| 6,700,279 | B1 | * | 3/2004 | Uchiyama et al. | ........... | 310/190 |
| 6,707,224 | B1 | | 3/2004 | Petersen | | |
| 6,798,111 | B1 | | 9/2004 | Petersen | | |
| 6,891,343 | B2 | * | 5/2005 | Petersen | ................. | 318/400.11 |
| 7,005,764 | B2 | | 2/2006 | Petersen | | |
| 7,026,773 | B2 | * | 4/2006 | Petersen | ................. | 318/400.01 |
| 7,166,948 | B2 | * | 1/2007 | Petersen | ..................... | 310/179 |
| 7,202,620 | B2 | | 4/2007 | Petersen | | |
| 2005/0184690 | A1 | | 8/2005 | Petersen | | |
| 2006/0119192 | A1 | | 6/2006 | Petersen | | |
| 2006/0197396 | A1 | * | 9/2006 | Pollock et al. | .............. | 310/166 |
| 2006/0244338 | A1 | | 11/2006 | Petersen | | |

\* cited by examiner

*Primary Examiner*—Rita Leykin

(57) ABSTRACT

System, method, and apparatus for commutating and controlling a multi-phase motor using one output rotor sensor and circuitry that measures time between rotor pole-to-pole transitions is disclosed. The exemplary system, method, and apparatus may utilize the polarity of the single-output rotor sensor and the measured time between the polarity transitions detected by the single-output rotor sensor.

22 Claims, 15 Drawing Sheets

3-Phase Unipolar Torque

4-Phase Unipolar Torque

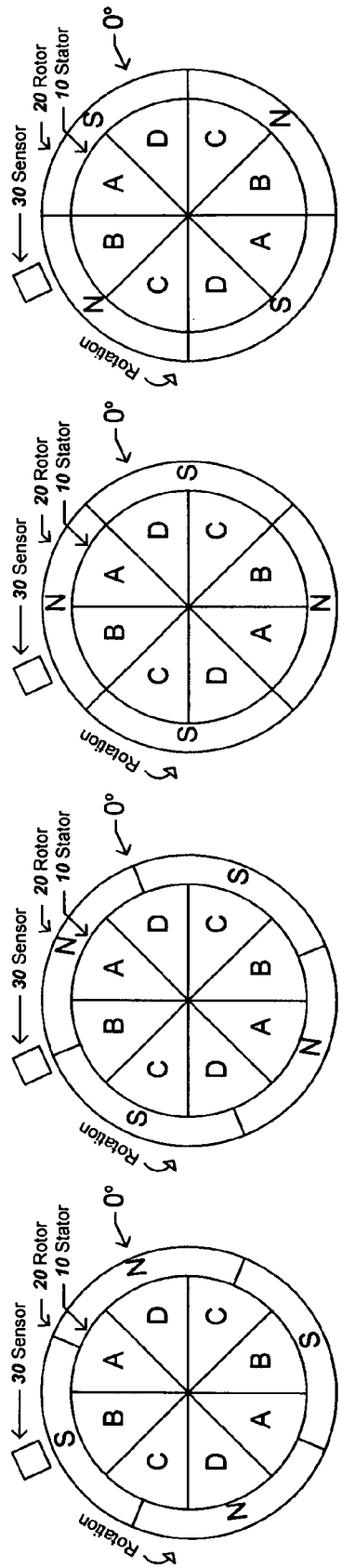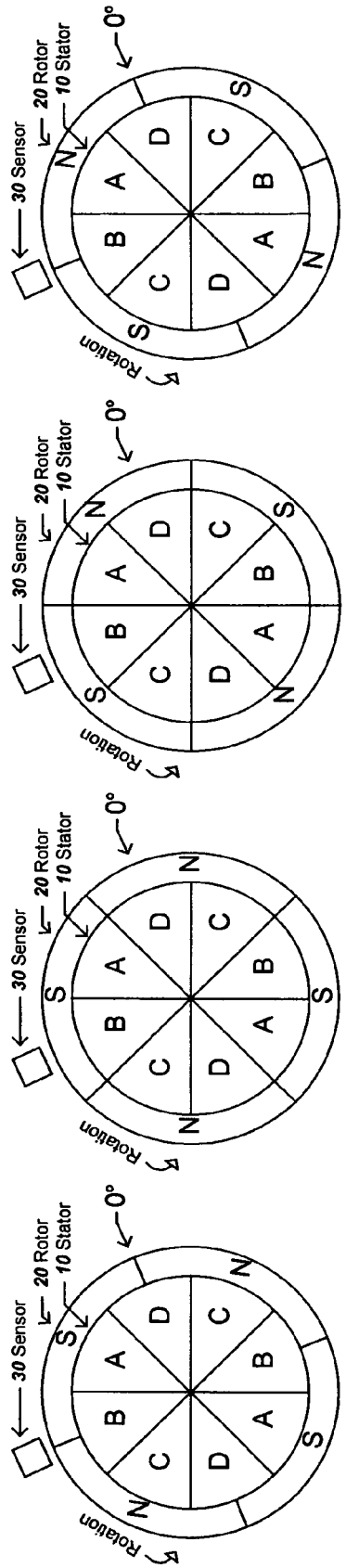
Fig. 10

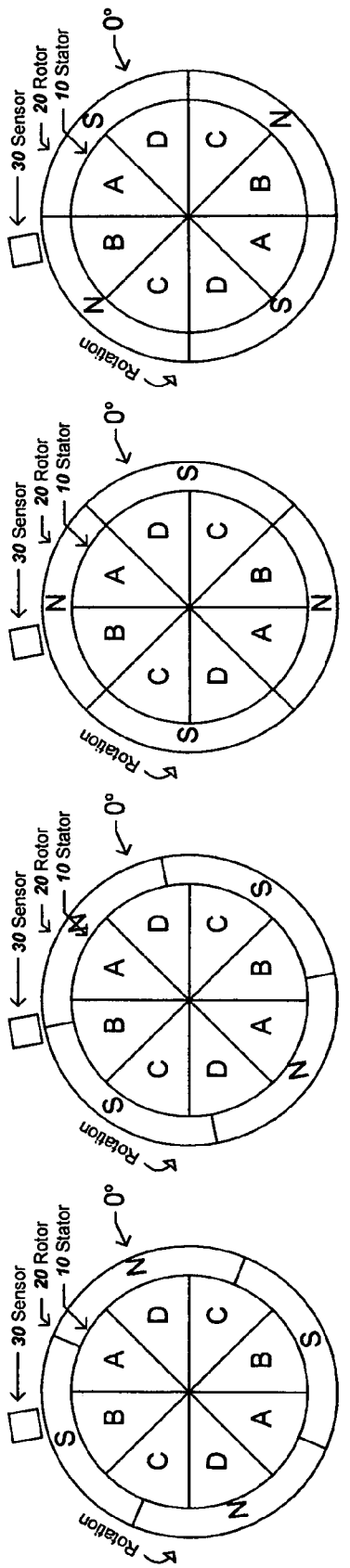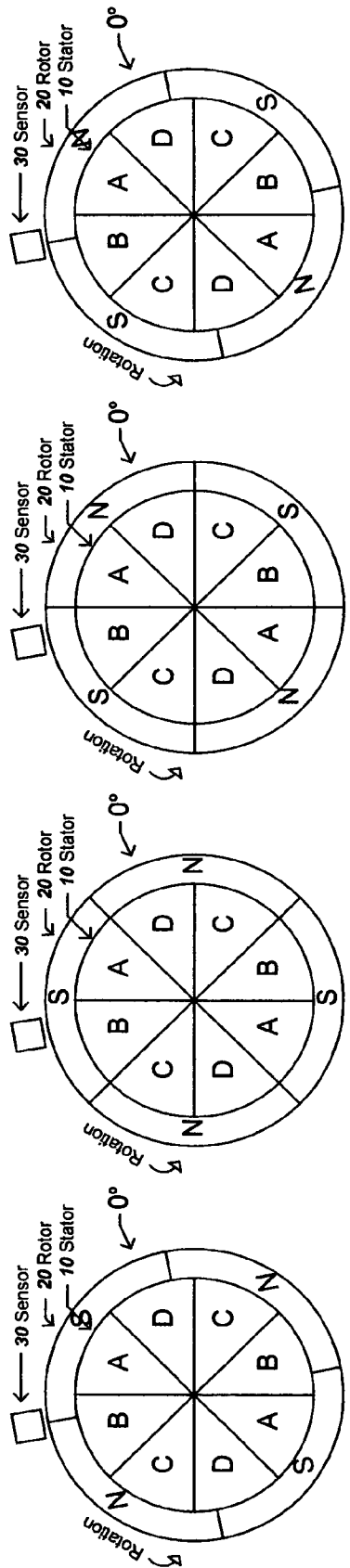
Fig. 11

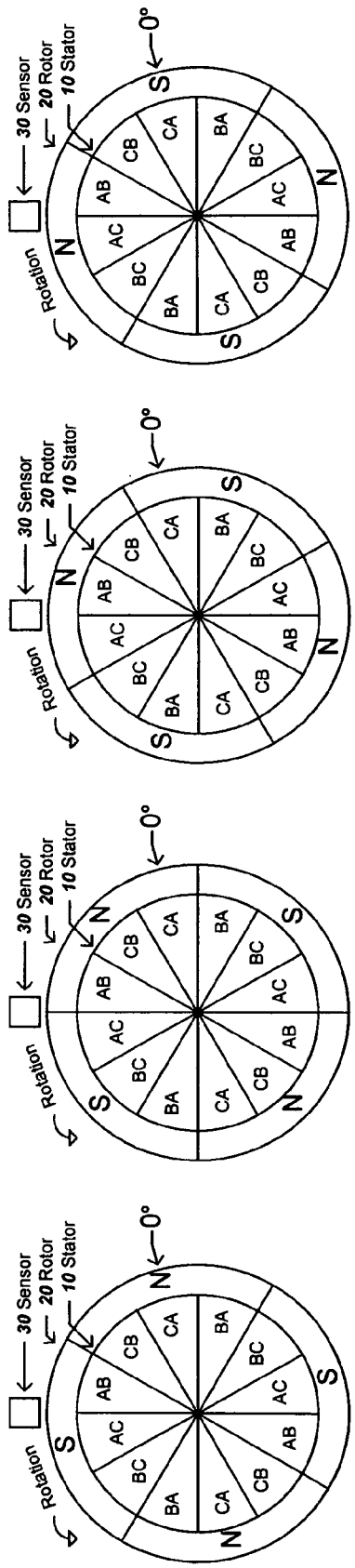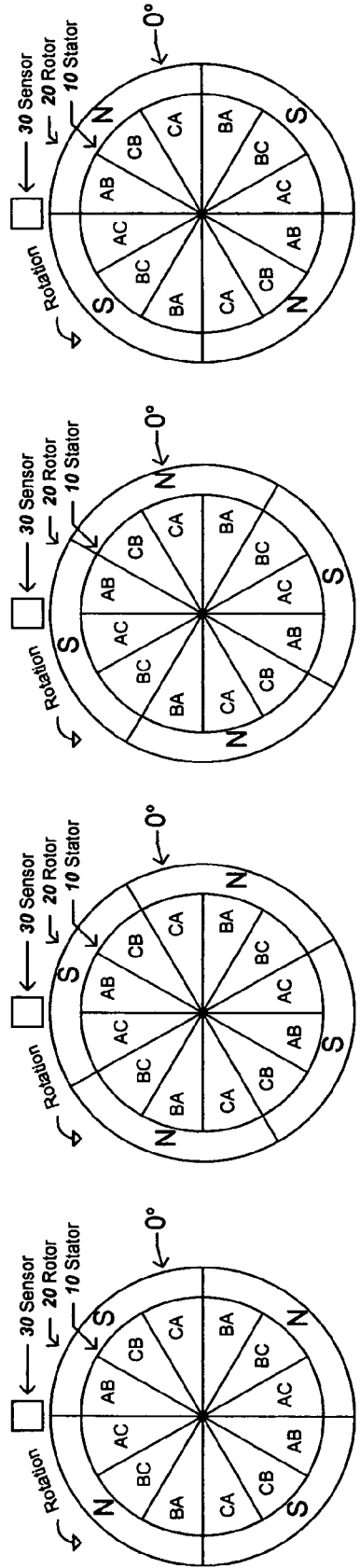
Fig. 14

SINGLE-SENSOR BASED COMMUTATION OF MULTI-PHASE MOTOR

CROSS-REFERENCE TO RELATED APPLICATIONS

The present application claims priority from U.S. provisional patent application Ser. No. 60/758,421, filed Jan. 12, 2006, by Mark Collins, incorporated by reference herein and for which benefit of the priority date is hereby claimed.

TECHNICAL FIELD

The present invention relates to multi-phase motors and more particularly, relates to a controller for a multi-phase motor.

BACKGROUND INFORMATION

In many commercial motor applications, for example computer fans, there is a need to reduce size and cost of the motor and motor system. However, while reducing the size and cost of the motor and motor system, an increase in motor torque is often desirable. For example, in the above computer fan application, the size and cost of the overall computers are decreasing, thus creating a need to reduce the size and cost of the applicable fan motors and fan motor systems. In addition, a reduction in size of the computer combined with an increase in computational performance typically means that more heat is internally generated inside the computer. For product reliability purposes, this increased heat may need to be removed from the product. The need to remove more heat may require a fan motor that generates greater torque while, at the same time, reducing the size and cost of the fan motor and fan motor system.

In one prior art application, a 1-coil or a 2-coil winding motor is used to provide low cost and low complexity. But as more torque may be required (due to increased heat removal requirements), the 1-coil or 2 coil winding motor may have limited efficiency and torque output. Multiphase motors may be more efficient and provide greater torque due to the reduced percentage of the low or no torque angles of rotation.

A multiphase motor control may utilize three sensors that may need to be accurately placed at precise locations at pre-defined distances apart from each other. These three sensors (that are located at different locations) detect rotor angular motion at different times (due to their respective different placement locations). This allows the system to distinguish each phase in the motor stator. This multiphase motor control may require precision assembly methods to properly locate three sensors and also the additional equipment cost of the three sensors.

Another type of multiphase motor control has one sensor but may also require a more complex rotor. This rotor includes physical coding or marking to distinguish between each stator phase. This more complex rotor may involve more material and assembly costs.

There is also a method for multiphase motor control called 'sensorless' control. This method typically involves monitoring the BEMF voltages of the motor stator windings, which are then used to interpolate phase location. This method does not involve the cost of any sensors, but may require complex, precision analog-type circuitry. Therefore, this 'sensorless' method may require the cost of the complex circuits and the cost associated with the time required to test and validate these complex circuits.

Accordingly, a need exists for a device, method, and system that provides less complex circuitry and easier implementation in a variety of applications and, therefore, is typically more cost effective. In addition, the device, method and system may only require the cost of one sensor and may not require the precision assembly and location of multiple sensors. In addition, the device, method and system may not require any physical coding or marking (other than the standard rotor magnetic pole-pairs) to distinguish each stator phase and, therefore, does not require the material and/or cost that the more complex rotor may incur. In addition, the device method and system may reduce the cost of multiphase motors so as to allow them to become more commercially feasible in applications that previously were only commercially feasible as 1-coil or 2-coil motors.

SUMMARY

The present invention provides an improved multiphase motor system. The multiphase motor system may utilize a single-output sensor with a rotor pole-to-pole time counter and controller/driver. The multiphase motor system may also utilize a standard (no extra coding/marking) rotor and stator.

The controller/driver of the system may use the single-output sensor, the rotor pole-to-pole time counter and the knowledge of the present 'driven' (energized) stator phase to determine when and which phase to commutate in the multiphase motor. Depending on system phase conditions, the controller/driver may commutate the motor windings immediately upon sensing a polarity change of the single-output sensor (which monitors angle rotation of the rotor) or may commutate the motor stator windings based on the rotor pole-to-pole time-counter which continuously measures time between polarity changes of the single-output sensor and adaptively adjusts the time to commutate based on the most-recent rotor pole-to-pole polarity changes. Another exemplary embodiment may combine the last several most-recent pole-to-pole times together and then use this as a basis to determine when to properly commutate the motor stator windings. Yet another exemplary embodiment may combine the most-recent pole-to-pole time(s) momentarily with another time count based on the condition that the motor is just starting and is in an acceleration mode in order to increase speed as a basis to determine when to properly commutate stator windings. And yet another exemplary embodiment may combine the most-recent pole-to-pole time(s) momentarily with another time count based on an external signal in order to increase or decrease speed as a basis to determine when to properly commutate stator windings. And yet another exemplary embodiment may combine the most-recent pole-to-pole time(s) momentarily with another time count based on system power supply voltage in order to increase or decrease speed as a basis to determine when to properly commutate stator windings.

The system can be adapted to many multiphase motor system configurations. For example, the system can be used to control a 3-phase unipolar or bipolar motor, a 4-phase unipolar motor, or many other coil winding configurations. The system can also be adapted to be used to control motor systems in which the rotor pole count does not match the stator pole count. For example, the system can be used to control a 3-phase stator and a 2-pole-pair rotor. Note that it can be used to drive motor systems wherein the stator pole count and the rotor pole-pair count are not equal. The invention may provide one or more of the following advantages.

(1) requires only 1 single-output rotor angular location sensor
(2) requires only physical placement of 1 single-output rotor angular location sensor
(3) requires only a standard permanent-magnet rotor (meaning rotor comprised of only the magnetic pole-pairs that purposely interact with the stator)
(4) any or all of electronic parts of the system may be integrated into one IC (meaning the sensor, rotor pole-to-pole time counter, controller, acceleration/deceleration compensator, commutation time counter, pre-driver and driver)
(5) system can be of general use due to adaptability to many different motors (meaning motors of different sizes, powers, and coil impedances, as well as, motors of different pole counts and styles)
(6) cost can be low due to low component count and use of 'standard' components
(7) size can be small due to low component count and high amount of possible integration
(8) adaptable to varying system speed and load conditions due to continuous measurement and updating of the rotor pole-to-pole time counter It is important to note that the present invention is not intended to be limited to a device, system, or method which must satisfy one or more of any stated objects, advantages, or features of the invention. It is also important to note that the present invention is not limited to the exemplary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein:

FIG. 10 is an exemplary version of controller/driver phase states versus angle of rotation when the single-output rotor sensor 30 is rotationally centered on a stator pole in a 4-phase unipolar motor system.

FIG. 11 is an exemplary version of controller/driver phase states versus angle of rotation when the single-output rotor sensor 30 is rotationally placed at an arbitrary angle between stator poles in a 4-phase unipolar motor system.

FIG. 14 is an exemplary version of controller/driver phase states versus angle of rotation when the single-output rotor sensor 30 is rotationally centered on a stator pole in a 3-phase bipolar motor system.

DETAILED DESCRIPTION

Figure 1:
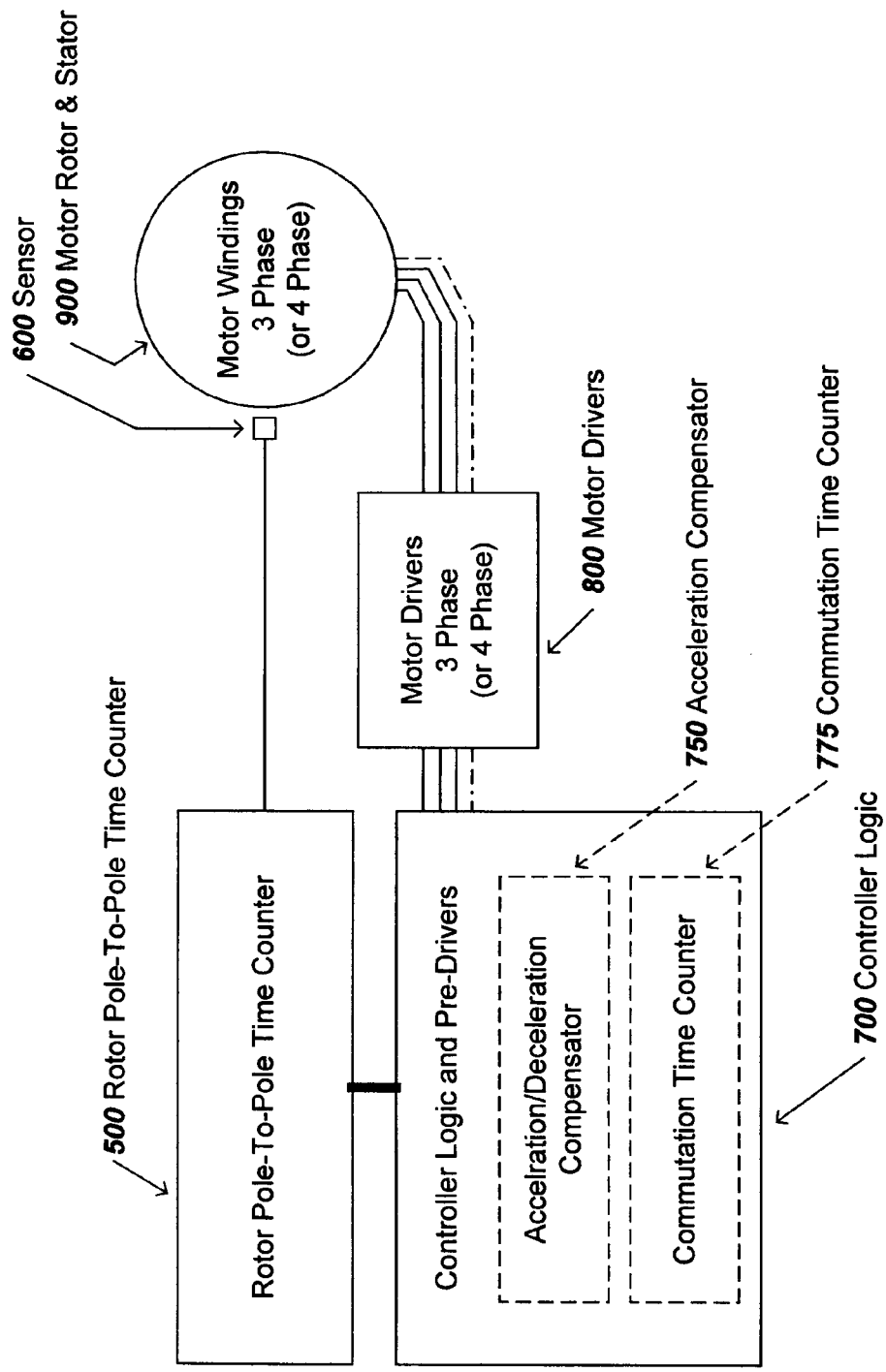
FIG. 1 is a diagram of the multiphase motor system according to an exemplary embodiment of the present invention.

Referencing FIG. 1, a multiphase DC permanent-magnet motor system schematic incorporating a single one-output rotor position sensor 600 and a rotor pole-to-pole time counter 500 is depicted according to an exemplary embodiment of the invention. Also shown are the motor controller logic/pre-drivers 700, the multiphase drivers 800 and the motor rotor/stator 900 as well as two optional devices (acceleration/deceleration compensator 750 and commutation time counter 775).

In a multiphase 'sensored' permanent-magnet motor system, the rotor position sensor 600 is utilized to detect discrete angular steps of rotational travel of the rotor 900 in real time. The angular value of the discrete angular steps of rotational travel may be defined by the number of magnetic poles in the standard permanent-magnet rotor. For example, in a typical rotor of 2 pole-pairs (4 poles), each discrete step is 90 rotational degrees ((360°/4 poles)=90°). The exemplary embodiment of the present invention may utilize the detected angular travel of one single-output sensor monitoring a standard rotor to determine when to properly commutate the multiple phases of the multiphase stator. This may be achieved by utilizing the rotor pole-to-pole time counter 500 to measure time between the polarity changes of the sensor 600 (in real time) and then utilizing the controller logic 700 to determine when (in real time) to commutate the multiple winding phases of the motor 900, via the motor drivers 800. The commutation of the motor may be based on the two sets of available data—the instantaneous polarity data (which infers present angular location) of the sensor 600 and the most-recent pole-to-pole time data (which infers approximate present angular velocity).

An optional exemplary variation of the system may include an acceleration/deceleration compensator 750, which modifies the output value of the rotor pole-to-pole time counter 500 under, for example, one or both of the following conditions (a) during motor speed ramp-up (acceleration) period at power-up or (b) during a system voltage supply change which results in a motor speed change (acceleration or deceleration). During the period at system power-up when the rotor velocity is accelerating (motor speed ramp-up time), the time between each rotor pole-to-pole period is decreasing so an accelerator/deceleration compensator 750 can be used to modify the times at which the controller 700 commutates the stator phases. After normal operating velocity is achieved, the acceleration/deceleration compensator 750 may no longer be utilized. The accelerator/deceleration compensator modifies/improves commutation times by decreasing the value of the rotor pole-to-pole time counter. Or during the period immediately following a system voltage supply change, the rotor velocity is accelerating or decelerating depending on whether the system voltage supply increased or decreased. During this period, the time between each rotor pole-to-pole period is changing (it is decreasing for rotor velocity increase or increasing for rotor velocity decrease) so an accelerator/deceleration compensator 750 can be used to modify the times at which the controller 700 commutates the stator phases. After normal operating velocity is achieved, the acceleration/deceleration compensator 750 may no longer be utilized. The accelerator/deceleration compensator improves commutation times by modifying the value of the rotor pole-to-pole time counter. Either an external signal or internal sensing signal (which sense a change in the system voltage supply) can operate the acceleration/deceleration 750 compensator.

Another optional exemplary variation of this system may include a commutation time counter 775. In many applications, depending on the number of rotor pole-pairs versus stator phases or depending on the arbitrary physical placement of the rotor sensor 600 in reference to the physical stator poles, it may be desirable to use a value of time count that is different from but yet still based on, the actual rotor pole-to-pole time count output. For example a time count value of ⅓ (or ⅔ or ⁴⁄₃ etc.) of the actual measured rotor pole-to-pole time may be desired. So the commutation time counter 775 may modify the output of the rotor pole-to-pole time counter 500 so as to generate the desired time count value. The output of the commutation time counter 775 may then be utilized by the controller 700 to properly commutate the stator phases.

Figure 2A:
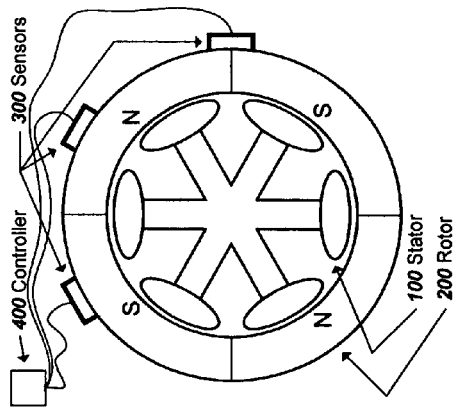
FIG. 2A is the stator 100, rotor 200, rotor sensors 300 and controller 400 of a first prior art system.

Referencing FIG. 2A, a prior art 3-phase stator 100 and 2-pole-pair rotor 200 is combined with a quantity of three one-output rotor position sensors 300 and a controller 400. Each one of the three sensors 300 may need to be located with angular precision in relation to the other sensors 300. The quantity of three sensors and additional precision assembly location of the three sensors adds extra costs. Since there are three stator 100 poles and only two rotor 200 pole-pairs, the combination of the three sensors 300 outputs are required to determine angular position and, hence, when to commutate properly. The present angular position is determined based on the known angular relationship between the three sensors 300 and the standard magnetic regions of the rotor 200 which are detected by the three one-output sensors 300 and combined with the controller's 400 knowledge of last phase.

Figure 2B:
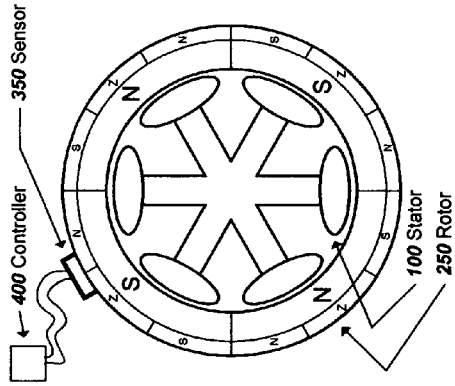
FIG. 2B is the stator 100, rotor 250, rotor sensor 350 and controller 400 of a second prior art system.

Referring to FIG. 2B, another version of prior art multiphase motor system has a 3-phase stator 100 combined with a non-typical 2-pole-pair rotor 250. The multiphase motor system may also have a two-output rotor position sensor 350 and a controller 400. Since there are 3 stator 100 poles and only 2 standard rotor pole-pairs, the non-typical rotor 250 includes additional magnetic and non-magnetic regions which combined with the two-output sensor 350 is required to determine angular position and, hence, when to commutate properly. The non-typical rotor 250 is manufactured by including extra magnetic pole regions and non-magnetic regions in specific regions of the rotor in addition to the standard magnetic poles. This may require extra manufacturing costs. In addition, two-output sensor may be required to differentiate between 3 different magnetic field intensity values. The present angular position may be determined based on the additional magnetic regions imbedded into the rotor 250 which are detected by the two-output sensor 350 and combined with the controller's 400 knowledge of last phase.

Figure 2C:
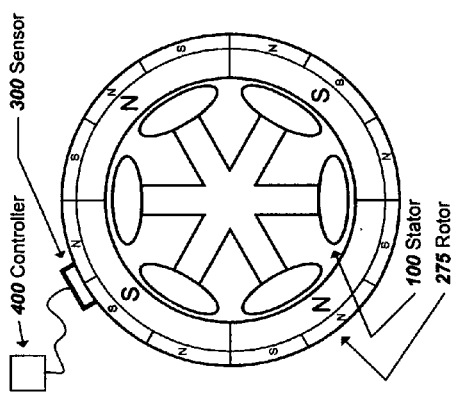
FIG. 2C. is the stator 100, rotor 275, rotor sensor 300 and controller 400 of a third prior art system.

Referring to FIG. 2C, a prior art system may combine a 3-phase stator 100 with a non-typical 2-pole-pair rotor 275. The prior art system also has one-output rotor position sensor 300 and a controller 400. Since there are 3 stator 100 poles and only 2 standard rotor pole-pairs, the non-typical rotor 275 includes additional magnetic regions which combined with the one-output sensor 300 may be required to determine angular position and, hence, when to commutate properly. The non-typical rotor 275 may be manufactured by including extra magnetic pole regions in specific regions of the rotor in addition to the standard magnetic poles. The present angular position may be determined based on the additional magnetic regions imbedded into the rotor 275 which may be detected by the one-output sensor 300 and combined with the controller's 400 knowledge of last phase.

Figure 3:
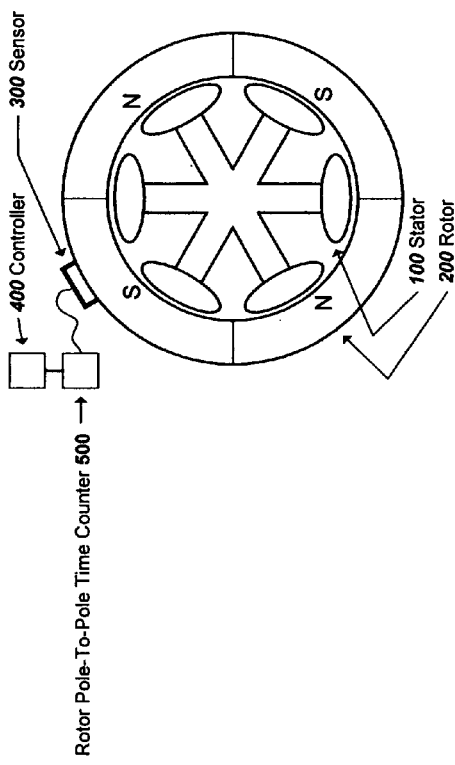
FIG. 3 is the stator 100, rotor 200, rotor sensor 300, controller 400 and the rotor pole-to-pole time counter 500 according to an exemplary embodiment of the present invention.

Referring to FIG. 3, according to an exemplary embodiment of the invention a 3-phase stator 100 may be combined with a 2-pole-pair rotor 200. The exemplary system may have one-output rotor position sensor 300, a controller 400, and a rotor pole-to-pole time counter 500. The rotor 200 combined with the one-output sensor 300 and with the electronic rotor pole-to-pole time counter 500 may be used to determine angular position and, hence, when to commutate properly. Since there are 3 stator 100 poles and only 2 rotor 200 pole-pairs, the combination of sensor 300 output and the rotor pole-to-pole time counter 500 may be used to determine angular position and, hence, when to commutate properly. The present angular position may be determined based on the standard magnetic regions of the rotor 200 which are detected by the one-output sensor 300 and the output of the rotor pole-to-pole time counter 500 and combined with the controller's 400 knowledge of last phase.

Figure 16:
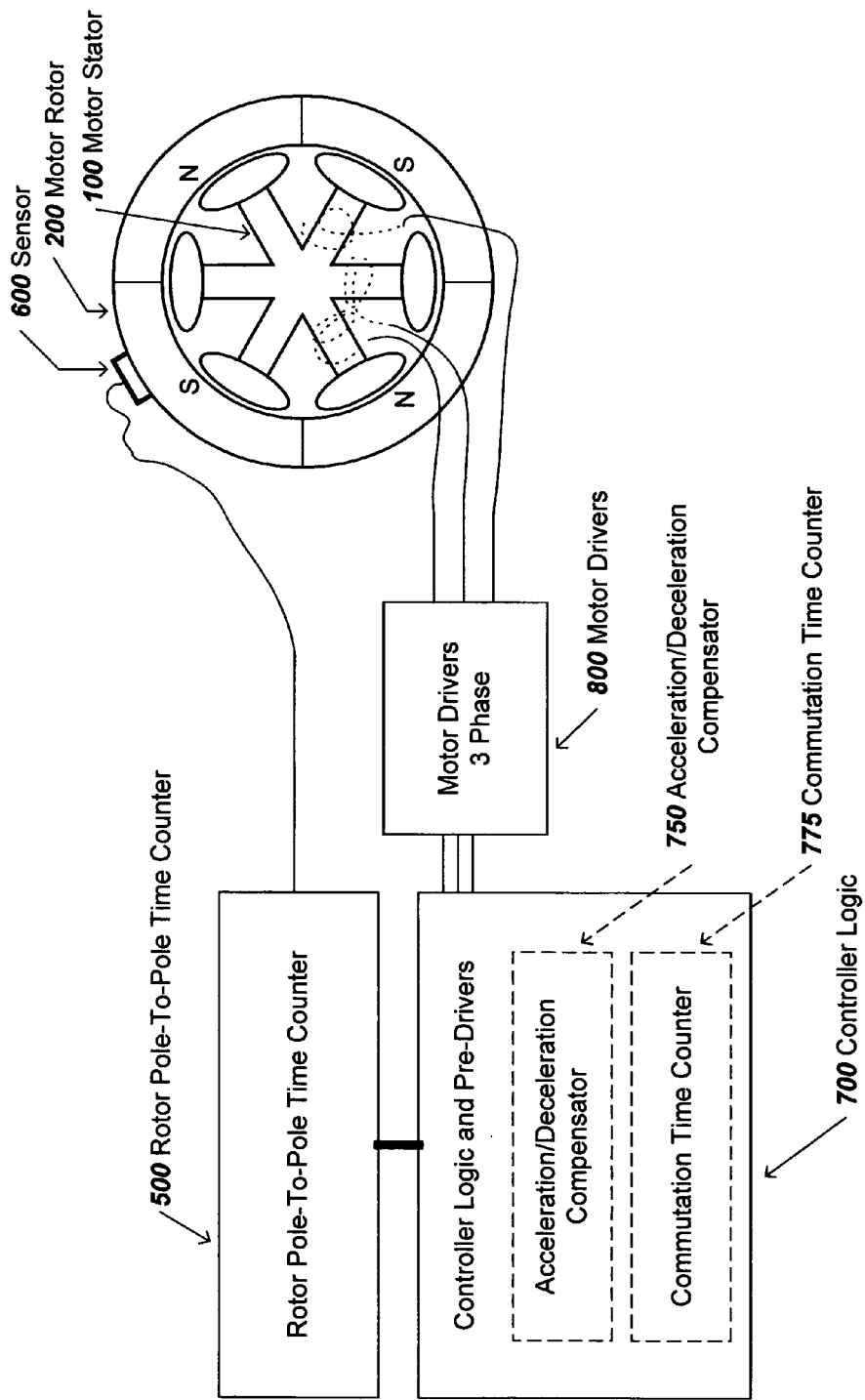
FIG. 16 is a diagram of the multiphase motor system shown internal components according to an exemplary embodiment of the present invention.

Now referencing FIG. 16, a more detailed explanation is disclosed. As the rotor 200 rotates about the stator 100 (due to the changing magnetic fields generated by changing stator phase energizations), the magnetic poles of the rotor rotate by the rotor sensor 600. The sensor 600 detects the polarities of the rotor magnetic poles as they rotate by the sensor 600. The sensor 600 thus outputs (to both the rotor pole-to-pole time counter 500 and the controller 700) an electronic logical high level or low level, which represents the magnetic polarity of the rotor pole which is rotating by at that point in time. Each time that the sensor output level changes state, the rotor pole-to-pole time counter may perform three actions: 1) stops the present pole-to-pole time count, 2) starts a new pole-to-pole time count and 3) outputs the just completed pole-to-pole time count to the controller 700. At this point in time, depending on the present system status (of which the controller 700 is knowledgeable of), the controller 700 may either immediately commutate to the next stator 100 phase (via the drivers 800) or may wait an amount of time equal to or based on the rotor pole-to-pole time count that the controller 700 has just received (called the most-recent pole-to-pole time count) from the rotor pole-to-pole time counter 500 and after this time based on the most recent pole-to-pole time count has elapsed then the controller 700 commutates to the next stator 100 phase (via the drivers 800). When the stator 100 phase is commutated, the stator magnetic field changes which causes the rotor 200 to continue to rotate. The entire system process continues to repeat. Thus, a multiphase motor can be operated by a single one-output rotor sensor combined with a rotor pole-to-pole time counter.

Still referencing FIG. 16, at motor start-up (time zero), the controller 700 may not know precisely what angular location the rotor 200 may be at because the rotor may have previously been located in many angular locations and the single rotor sensor 600 may not supply enough location data to precisely determine location. The controller 700 may force the rotor 200 to move and stop at a pre-defined location by energizing a pre-defined stator 100 phase. At this point, the controller 700 now has knowledge of the present status of the motor system (the present stator 100 phase is known as well as the output level of the rotor sensor 600 which is sensing the adjacent rotor 200 magnetic pole). Now to start desired rotor 200 motion, the controller 700 commutates the stator 100 to the next stator phase (the next sequential phase after the pre-defined phase) and commands the rotor pole-to-pole time counter 500 to start the first pole-to-pole time count. Now commutating the stator phase causes the rotor 200 to rotate in the desired direction. Next, when the rotor sensor 600 detects a change in rotor magnetic polarity (due to rotor rotation), the rotor pole-to-pole time counter 500 completes the first (now the most-recent pole-to-pole time count). At this point, the controller 700 may utilize the most-recent pole-to-pole time count and the system configuration to determine when to commutate the stator 100 to the next phase. The controller 700 may commutate to the next phase immediately upon receiving notice of the first rotor sensor 600 output level change. Now the controller 700 may have all the data to continue motor operation: 1) the present phase that the stator is in, 2) the output level of the rotor sensor and 3) the most-recent pole-to-pole time count. Thus the controller 700 keeps the motor operating by continuously monitoring the data inputs and utilizing them to commutate the stator phases at the proper times based on the pre-defined system configuration. Depending on both the system configuration and the present system status, the controller 700 determines the proper commutation times in sequence.

Another performance embodiment of the systems involves what happens when the motor becomes stalled (rotor is locked in one position). In the case where the controller 700 has determined to commutate time-coincident with the next occurrence of the rotor sensor 600 detecting a new rotor 200 magnetic pole, the controller 700 correctly knows what state the rotor and stator were in at the point in time that the stall occurred because the rotor magnetic pole change has not occurred. Thus the controller 700 can attempt to properly re-start the motor based on current status. In the case where the controller 700 may have determined to commutate due to a time count based on the most-recent pole-to-pole time count having fully elapsed. The controller 700 may incorrectly assume what angular location the rotor 200 should have reached but has not yet reached. However, this possible incorrect assumption may not be a problem, because the controller 700 can attempt to properly re-start the motor based on the incorrect data. The phase that the controller 700 may energize may be in the correct direction and may be adequate in magnitude of torque (assuming that all locking mechanism has been removed). If the correct phase had been energized, more torque would have been generated, but the phase that the controller 700 did energize may be adequate. There is also another option that may be utilized after a stall. In place of trying to re-start the motor at the stator 100 phase where the controller 700 assumes that the stall occurred (as described in above paragraph), a normal pre-defined start-up with the pre-defined alignment phase can be implemented as previously described.

Still referencing FIG. 16, the acceleration/deceleration compensator 750 can be used to modify the output value of the most-recent pole-to-pole time count. The purpose of this value modification is to more properly predict the time to commutate to the next stator phase 100 when the motor rotational velocity is increasing or decreasing. The acceleration/deceleration compensator 750 may subtract an amount of time value from the most-recent pole-to-pole time value and, thereby, force the next stator 100 phase commutation to occur earlier than the most-recent pole-to-pole time value would have done. This option may be utilized when a decrease in pole-to-pole time is anticipated, for example, in motor speed ramp-up time at power-up or when the system voltage supply has increased. The acceleration/deceleration compensator 750 may add an amount of time value from the most-recent pole-to-pole time value and, thereby, force the next stator 100 phase commutation to occur later than the most-recent pole-to-pole time value would have done. This option may be utilized when an increase in pole-to-pole time is anticipated, for example, when the system voltage supply has decreased. The acceleration/deceleration compensator 750 may be activated by one or all of the following conditions: (a) the power-up process occurring or (b) by an external signal or (c) an internal sensor detecting a change of the system voltage supply. After the motor velocity is constant, the acceleration compensator 750 may not be utilized.

Still referencing FIG. 16, the commutation time counter 775 can be used to modify the output value of the most-recent pole-to-pole time count. The purpose of this value modification is to more properly predict the time to commutate to the next stator phase 100 when the desired proper time count value is not exactly equal to the measured rotor pole-to-pole time count value but is mathematically related to the measured rotor pole-to-pole time count value. Depending on system configurations, some common desired time count value relationships are ½, ⅓, ⅔, ⅘. However, any desired time count value relationships may be utilized. The output of the commutation time counter 775 may then be utilized by the controller 700 to properly commutate the stator phases.

As previously noted, the rotor pole-to-pole time counter 500 may be used to measure the time that passes while the rotor 200 is rotating through one entire magnetic pole. The rotor pole-to-pole time counter may be an electronic clock pulse counter. As such, the counter would count the number of system clock pulses that occur during the time that it takes for the rotor 200 to rotate one magnetic pole completely by the rotor sensor 600. The system clock may be the same clock utilized by the controller 700. The system clock may be internal to the controller 700 or may be an external clock imported into the motor system. The rotor pole-to-pole time counter may also use a clock which is a fractional frequency of the system clock; such as ½ or ⅓ or ¼ or any fractional value of the system clock. The use of a fractional frequency (of the system clock) clock in the rotor pole-to-pole time counter while using the true system clock in the controller 700 effectively generates rotor pole-to-pole time count values that are fractional to the true rotor pole-to-pole time count value and as such the output of the rotor pole-to-pole time counter 500 may be directly useable (without any modification) by the controller 700 to generate commutation of the stator 100 phases at the proper time (in real time).

Figure 4:
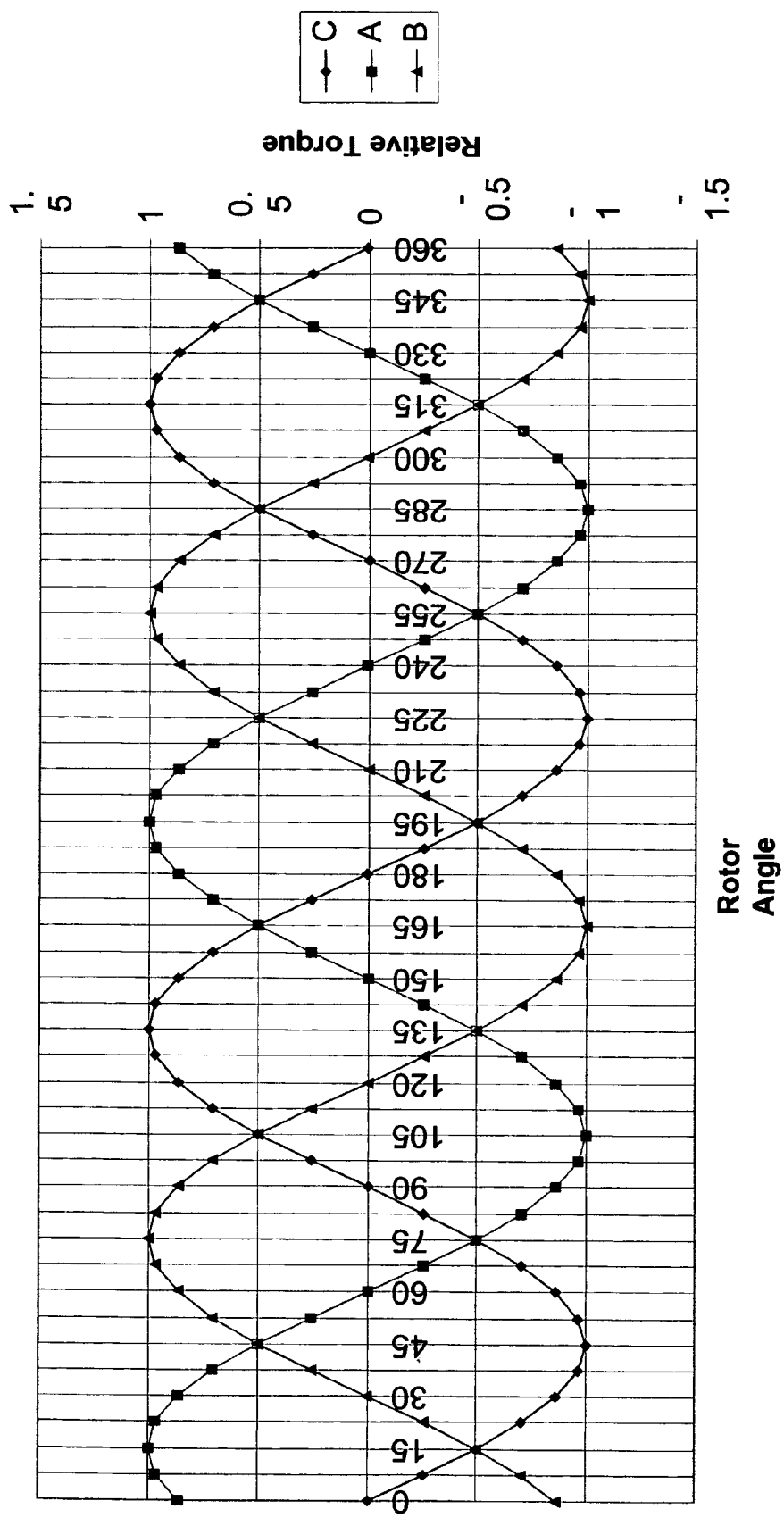
FIG. 4 is a graph showing relative torque of different phases versus angle of rotation of a 3-phase unipolar motor.

Now referencing FIG. 4, the phase-torque versus rotor angle relationship of a 3-phase unipolar motor can be seen. This is based on the arbitrary reference selection as Phase C set at rotational angle of 0°. Note that there may be some overlap of torque among the 3 phases. This overlap of torque is the reason that a 3-phase unipolar motor may be more torque efficient than a 2-phase motor, as noted earlier. If Phase C is set as the pre-defined alignment phase and energized so as to generate a south pole, the rotor may move to and stop at rotational angle of 0°. Thus, at this point, the motor system may have the motor with phase-torque relationship as shown in FIG. 4. As can be seen from this phase-torque relationship (after being aligned), the torque generated by de-energizing Phase C and then energizing Phase A may cause the rotor to move/rotate. At 45°, if the system de-energizes Phase A and energizes Phase B, the rotor would continue to rotate and thus continue to follow this de-energization/energization process (commutation) indefinitely. In other words, the motor will continue to rotate.

Figure 5:
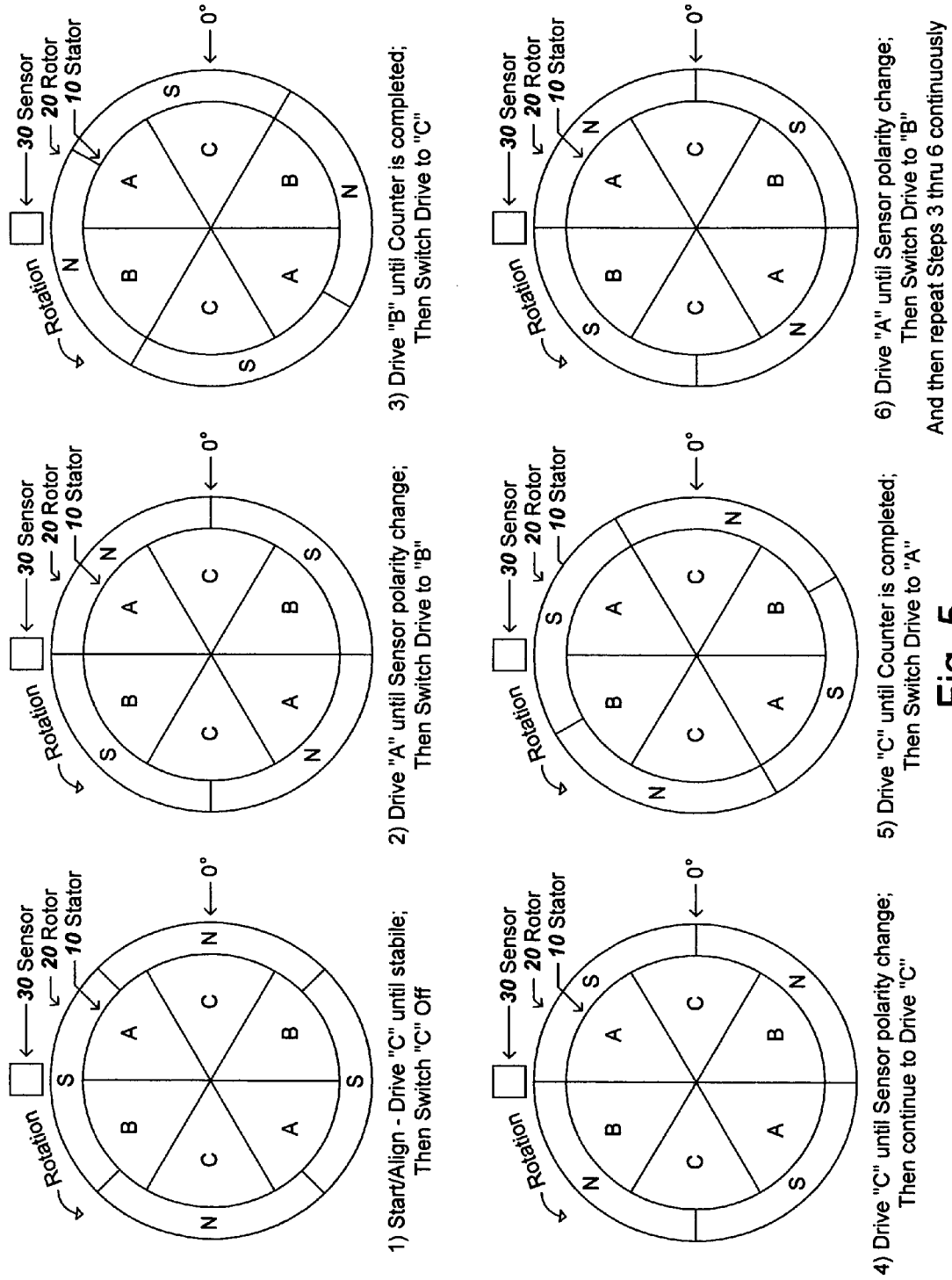
FIG. 5 is an exemplary version of controller/driver phase states versus angle of rotation when the single-output rotor sensor 30 is rotationally centered between stator poles in a 3-phase unipolar motor system.

Referencing FIG. 5, the utilization of an exemplary embodiment will be described via the start-up and rotational process of a 3-phase unipolar stator 10 with a 2-pole-pair permanent-magnet rotor 20 and a single rotor sensor 30 is physically located within the useable magnetic field intensity of the rotor at a rotation angle of the rotor that is centered between the physical structures of two stator poles. In Step 1, Phase C of the stator 10 is energized as an alignment phase and the rotor 20 moves to and stops at 0°, then Phase C is de-energized. In Step 2, Phase A is energized and the rotor pole-to-pole counter is started. When the sensor 30 detects a rotor 20 magnetic polarity change, Phase A is de-energized, Phase B is energized. The rotor pole-to-pole counter is stopped and the value outputted to the controller. The rotor pole-to-pole counter is then re-started. In Step 3, Phase B is energized until the controller counted to a time equal to $4/3$ of the most-recent pole-to-pole count. Then Phase B is de-energized and Phase C is energized. In Step 4, Phase C is energized and when the sensor 30 detects a rotor 20 magnetic polarity change, the rotor pole-to-pole counter is stopped and the value outputted to the controller and then the rotor pole-to-pole counter is re-started. In Step 5, Phase C is energized until the controller counted to a time equal to $1/3$ of the most-recent pole-to-pole count. Then Phase C is de-energized and Phase A is energized. In Step 6, Phase A is energized and when the sensor 30, detects a rotor 20 magnetic polarity change, Phase A is de-energized, Phase B is energized and the rotor pole-to-pole counter is stopped and the value outputted to the controller. The rotor pole-to-pole counter is then re-started. Steps 3 through 6 are now continuously repeated with the one exception that $2/3$ value count may now be used in step 3 ($4/3$ may be used only in the first Step 3).

Figure 6:
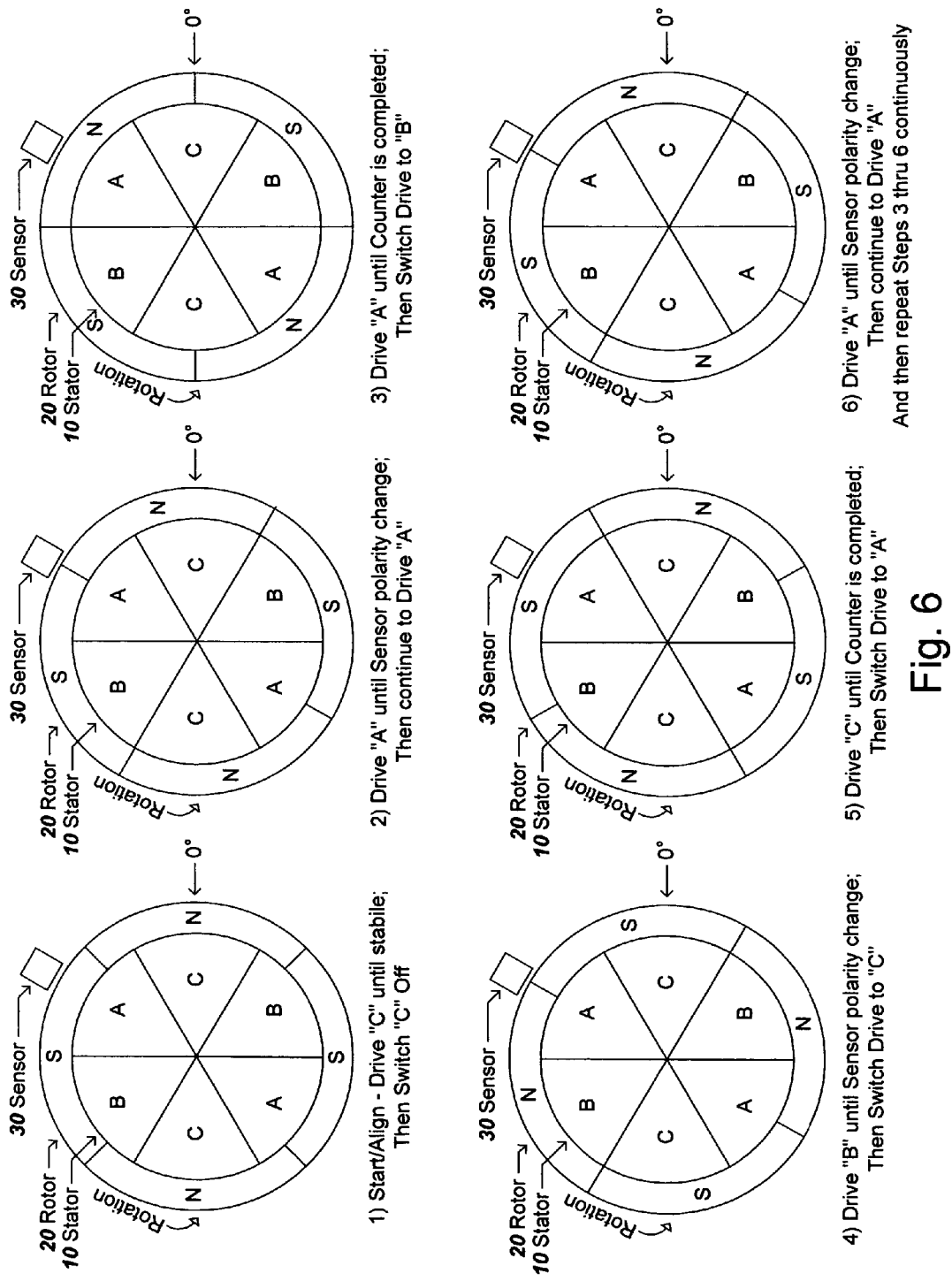
FIG. 6 is an exemplary version of controller/driver phase states versus angle of rotation when the single-output rotor sensor 30 is rotationally centered on a Stator pole in a 3-phase unipolar motor system.

Referencing FIG. 6, an exemplary embodiment will be described via the start-up and rotational process of a 3-phase unipolar stator 10 with a 2-pole-pair permanent-magnet rotor 20 and a single rotor sensor 30 is physically located within the useable magnetic field intensity of the rotor at a rotation angle of the rotor that is centered directly in-line with the physical structure of one stator pole. In Step 1, Phase C of the stator 10 is energized as an alignment phase and the rotor 20 moves to and stops at 0°, then Phase C is de-energized. In Step 2, Phase A is energized and the rotor pole-to-pole counter is started. When the sensor 30, detects a rotor 20 magnetic polarity change the rotor pole-to-pole counter is stopped and the value outputted to the controller and then the rotor pole-to-pole counter is re-started. In Step 3, Phase A is energized until the controller counted to a time equal to 2 of the most-recent pole-to-pole count. Then Phase A is de-energized and Phase B is energized. In Step 4, Phase B is energized and when the sensor 30 detects a rotor 20 magnetic polarity change, Phase B is de-energized, Phase C is energized and the rotor pole-to-pole counter is stopped and the value outputted to the controller and then the rotor pole-to-pole counter is re-started. In Step 5, Phase C is energized until the controller counted to a time equal to $2/3$ of the most-recent pole-to-pole count. Then Phase C is de-energized and Phase A is energized. In Step 6, Phase A is energized and when the sensor 30, detects a rotor 20 magnetic polarity change, the rotor pole-to-pole counter is stopped and the value outputted to the controller and then the rotor pole-to-pole counter is re-started. Steps 3 through 6 are now continuously repeated with the one exception that $1/3$ value count may now be used in Step 3 (2 may be used only in the first Step 3).

Figure 7:
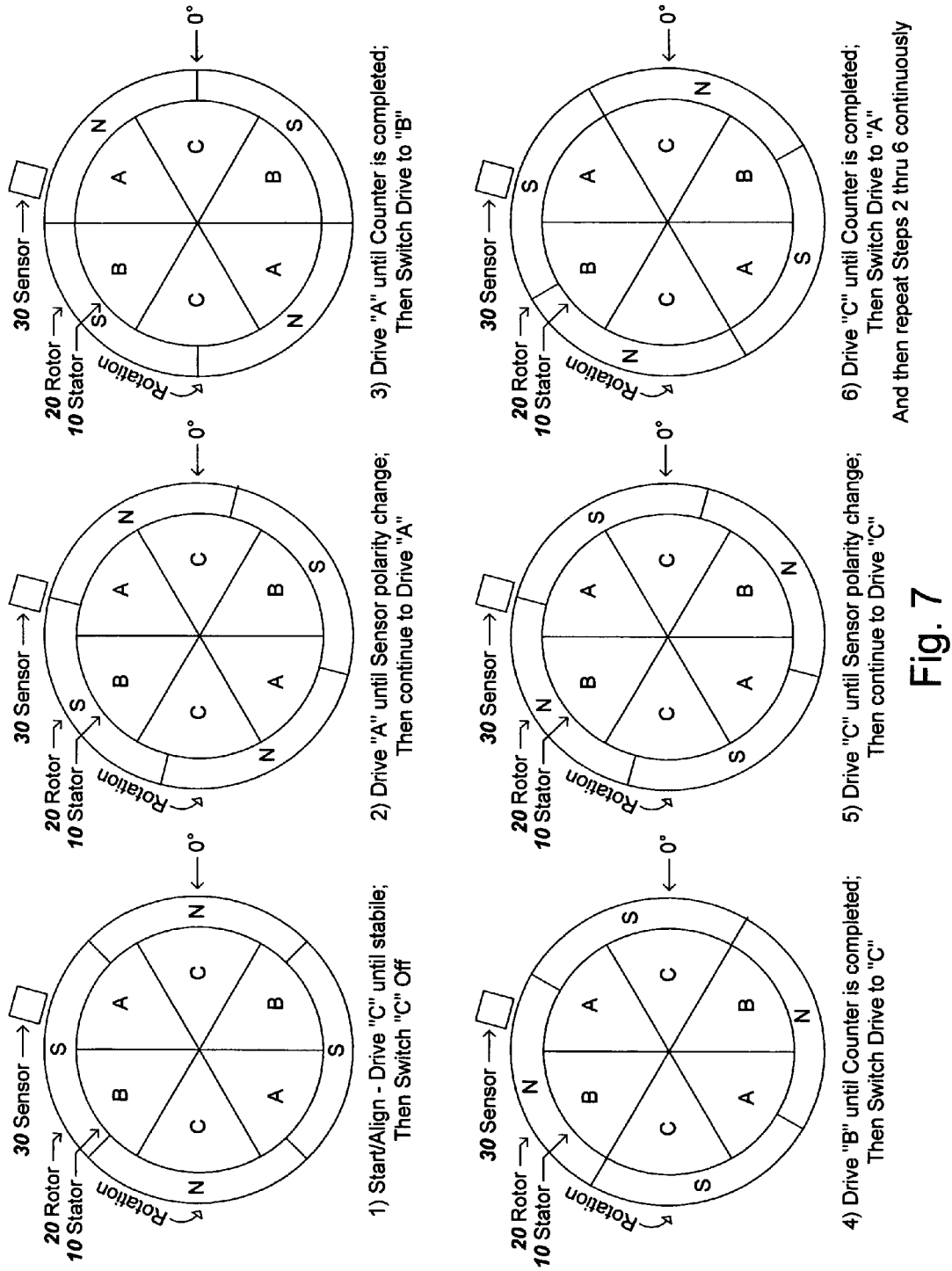
FIG. 7 is an exemplary version of controller/driver phase states versus angle of rotation when the single-output rotor sensor 30 is rotationally placed at an arbitrary angle between Stator poles in a 3-phase unipolar motor system.

Referencing FIG. 7, an exemplary embodiment will be described via the start-up and rotational process of a 3-phase unipolar stator 10 with a 2-pole-pair permanent-magnet rotor 20 and a single rotor sensor 30 is physically located within the useable magnetic field intensity of the rotor at a rotation angle of the rotor that is arbitrarily chosen between the physical structures of two stator poles. In Step 1, Phase C of the stator 10 is energized as an alignment phase and the rotor 20 moves to and stops at 0°, then Phase C is de-energized. In Step 2, Phase A is energized and the rotor pole-to-pole counter is started. When the sensor 30, detects a rotor 20 magnetic polarity change the rotor pole-to-pole counter is stopped and the value outputted to the controller and then the rotor pole-to-pole counter is re-started. In Step 3, Phase A is energized until the controller counted to a time equal to w of the most-recent pole-to-pole count. Then Phase A is de-energized and Phase B is energized. In Step 4, Phase B is energized until the controller counted to a time equal to x of the most-recent pole-to-pole count. Then Phase B is de-energized and Phase C is energized. In Step 5, Phase C is energized and when the sensor 30, detects a rotor 20 magnetic polarity change the rotor pole-to-pole counter is stopped and the value outputted to the controller and then the rotor pole-to-pole counter is re-started. In Step 6, Phase C is energized until the controller counted to a time equal to y of the most-recent pole-to-pole count. Then Phase C is de-energized and Phase A is energized. Steps 2 through 6 are now continuously repeated with the one exception that z value count may now be used in Step 3 (w may be used only in the first Step 3). In this exemplary embodiment, the variables w, x, y and z are a function of the physical placement of the rotor sensor relative to the physical location of the stator poles and have a fractional relationship to the rotor pole-to-pole time count value.

Figure 8:
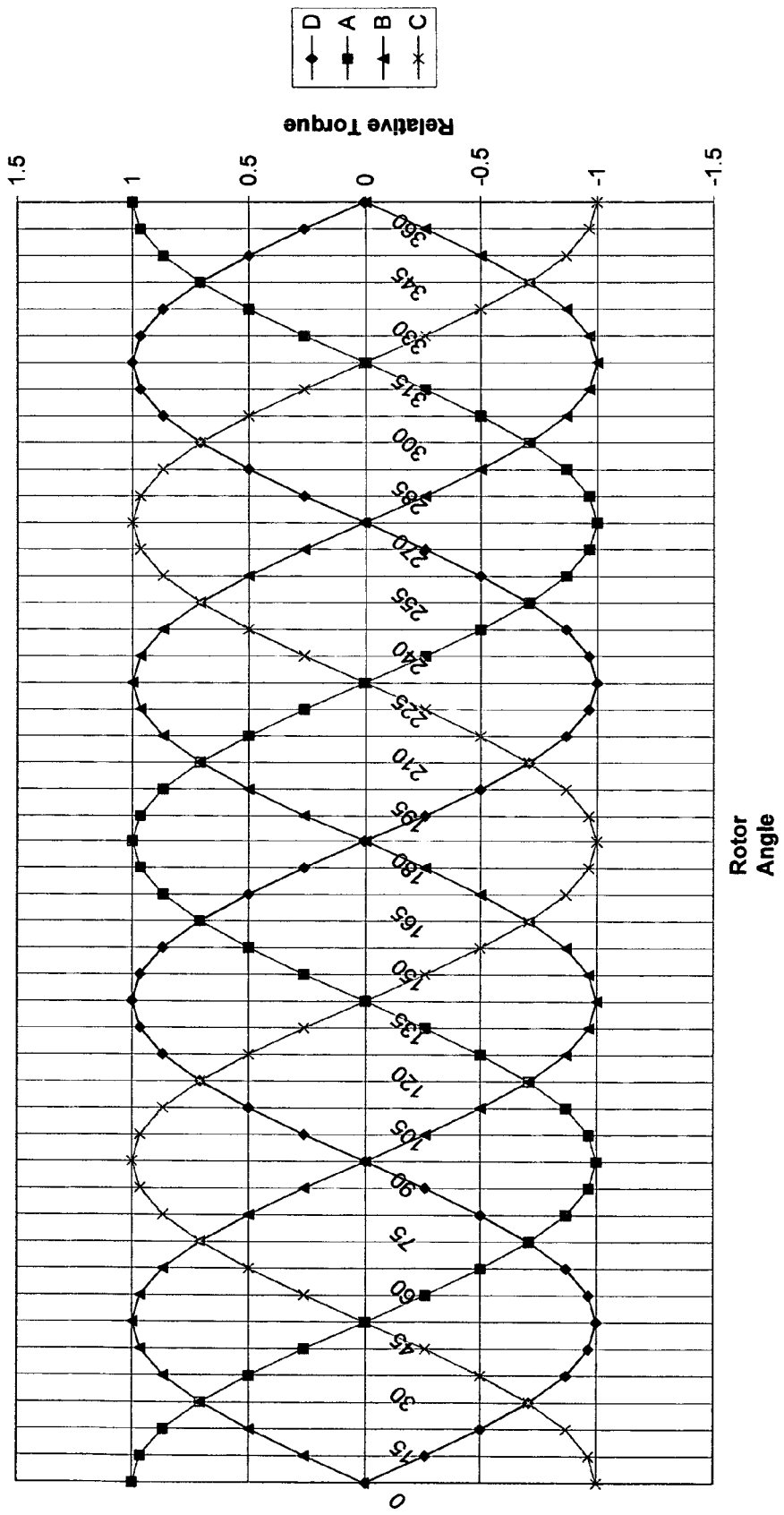
FIG. 8 is a graph showing relative torque of different phases versus angle of rotation of a 4-phase unipolar motor.

Now referencing FIG. 8, the phase-torque versus rotor angle relationship of a 4-phase unipolar motor can be seen. This is based on the arbitrary reference selection as Phase D set at rotational angle of 0°. Note that there is some overlap of torque among the 4 phases. This overlap of torque may be the reason that a 4-phase unipolar motor is more torque efficient than a 2-phase motor, as noted earlier. If Phase D is set as the pre-defined alignment phase and energized so as to generate a South Pole, the rotor will move to and stop at rotational angle of 0°. Thus, at this point, the motor system will have motor with phase-torque relationship as shown in FIG. 8. As can be seen from this phase-torque relationship (after being aligned), the torque generated by de-energizing Phase D and then energizing Phase A may cause the rotor to move (rotate). At 22.5°, if Phase A is de-energized and Phase B energized, the rotor may continue to rotate.

Figure 9:
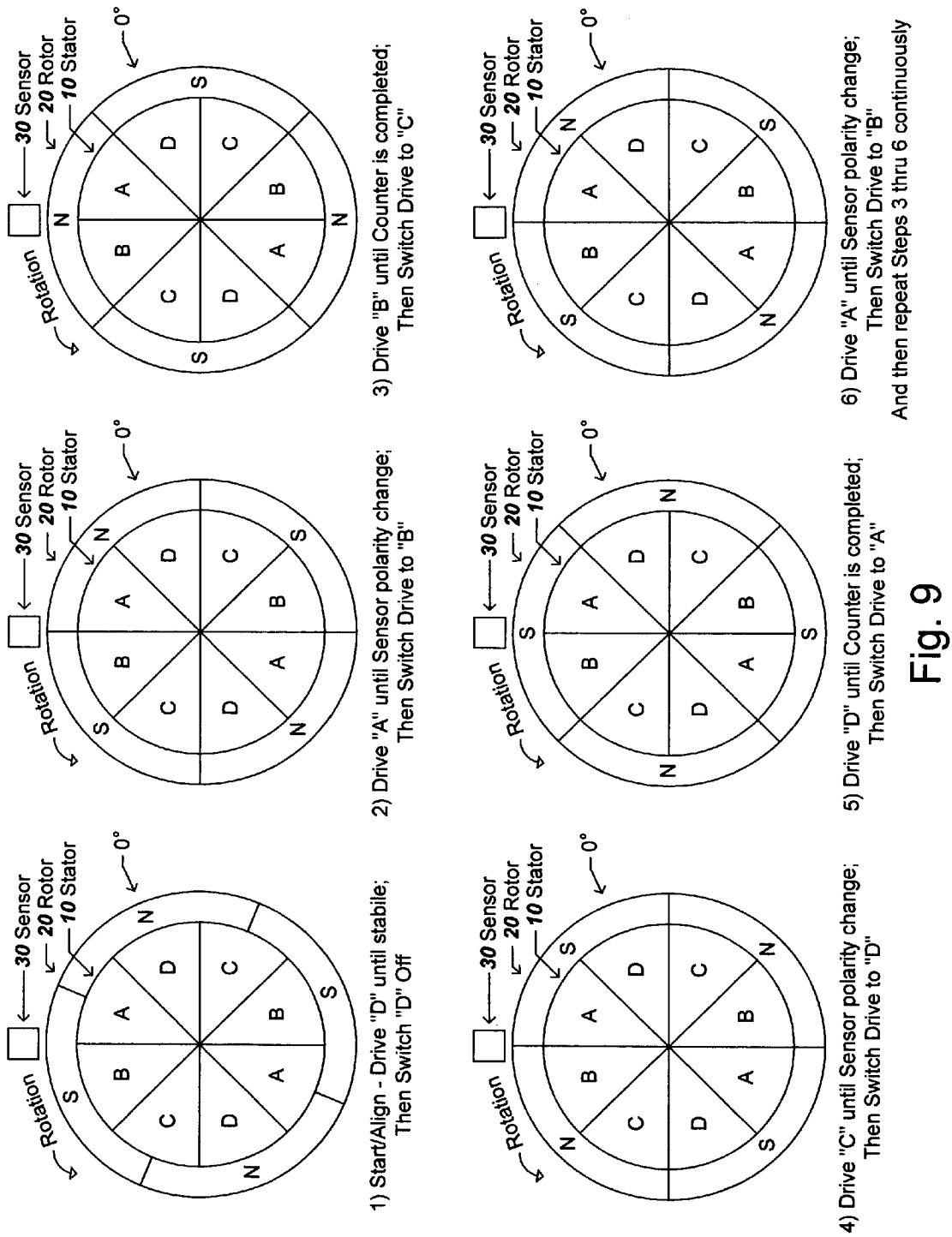
FIG. 9 is an exemplary version of controller/driver phase states versus angle of rotation when the single-output rotor sensor 30 is rotationally centered between stator poles in a 4-Phase unipolar motor system.

Referencing FIG. 9, an exemplary embodiment will be described via the start-up and rotational process of a 4-phase unipolar stator 10 with a 2-pole-pair permanent-magnet rotor 20 and a single rotor sensor 30 may be physically located within the useable magnetic field intensity of the rotor at a rotation angle of the rotor that is centered between the physical structures of two stator poles. In Step 1, Phase D of the stator 10 is energized as an alignment phase and the rotor 20 moves to and stops at 0°, then Phase D is de-energized. In Step 2, Phase A is energized and the rotor pole-to-pole counter is started. When the sensor 30, detects a rotor 20 magnetic polarity change, Phase A is de-energized, Phase B is energized and the rotor pole-to-pole counter is stopped and the value outputted to the controller and then the rotor pole-to-pole counter is re-started. In Step 3, Phase B is energized until the controller counts to a time equal to 2 of the most-recent pole-to-pole count. Then Phase B is de-energized and Phase C is energized. In Step 4, Phase C is energized and when the sensor 30 detects a rotor 20 magnetic polarity change, Phase C is de-energized, Phase D is energized and the rotor pole-to-pole counter is stopped and the value outputted to the controller and then the rotor pole-to-pole counter is re-started. In Step 5, Phase D is energized until the controller counted to a time equal to ½ of the most-recent pole-to-pole count. Then Phase D is de-energized and Phase A is energized. In Step 6, Phase A is energized and when the sensor 30, detects a rotor 20 magnetic polarity change, Phase A is de-energized, Phase B is energized and the rotor pole-to-pole counter is stopped and the value outputted to the controller and then the rotor pole-to-pole counter is re-started. Steps 3 through 6 may now be continuously repeated with the one exception that ½ value count may now be used in Step 3 (2 may be used only in the first Step 3).

Referencing FIG. 10, an exemplary embodiment will be described via the start-up and rotational process of a 4-phase unipolar stator 10 with a 2-pole-pair permanent-magnet rotor 20 and a single rotor sensor 30 is physically located within the useable magnetic field intensity of the rotor at a rotation angle of the rotor that is centered directly in-line with the physical structure of one stator pole. In Step 1, Phase D of the stator 10 is energized as an alignment phase and the rotor 20 moves to and stops at 0°, then Phase D is de-energized. In Step 2, Phase A is energized and the rotor pole-to-pole counter is started. When the sensor 30, detects a rotor 20 magnetic polarity change, Phase A is de-energized, Phase B is energized and the rotor pole-to-pole counter is stopped and the value outputted to the controller and then the rotor pole-to-pole counter is re-started. In Step 3, Phase B is energized until the controller counted to a time equal to ½ of the most-recent pole-to-pole count. Then Phase B is de-energized and Phase C is energized. In Step 4, Phase C is energized until the controller counted to a time equal to 1 of the most-recent pole-to-pole count. Then Phase C is de-energized and Phase D is energized. In Step 5, Phase D is energized and when the sensor 30, detects a rotor 20 magnetic polarity change, the rotor pole-to-pole counter is stopped and the value outputted to the controller and then the rotor pole-to-pole counter is re-started. In Step 6, Phase D is energized until the controller counted to a time equal to ¼ of the most-recent pole-to-pole count. Then Phase D is de-energized and Phase A is energized. In Step 7, Phase A is energized until the controller counted to a time equal to ½ of the most-recent pole-to-pole count. Then Phase A is de-energized and Phase B is energized. In Step 8, Phase B is energized and when the sensor 30, detects a rotor 20 magnetic polarity change, the rotor pole-to-pole counter is stopped and the value outputted to the controller and then the rotor pole-to-pole counter is re-started. Then Steps 3 through 8 are continuously repeated with the two exceptions that ¼ value count may now be used in Step 3 (½ may be used only in the first Step 3) and that ½ value count may now be used in Step 4 (1 may be used only in the first Step 4).

Referencing FIG. 11, an exemplary embodiment will be described via the start-up and rotational process of a 4-phase unipolar stator 10 with a 2-pole-pair permanent-magnet rotor 20 and a single rotor sensor 30 is physically located within the useable magnetic field intensity of the rotor at a rotation angle of the rotor that is arbitrarily chosen between the physical structures of two stator poles. In Step 1, Phase D of the stator 10 is energized as an alignment phase and the rotor 20 moves to and stops at 0°, then Phase D is de-energized. In Step 2, Phase A is energized and the rotor pole-to-pole counter is started. When the sensor 30, detects a rotor 20 magnetic polarity change, Phase A is de-energized, Phase B is energized and the rotor pole-to-pole counter is stopped and the value outputted to the controller and then the rotor pole-to-pole counter is re-started. In Step 3, Phase B is energized until the controller counted to a time equal to w of the most-recent pole-to-pole count. Then Phase B is de-energized and Phase C is energized. In Step 4, Phase C is energized until the controller counted to a time equal to x of the most-recent pole-to-pole count. Then Phase C is de-energized and Phase D is energized. In Step 5, Phase D is energized and when the sensor 30, detects a rotor 20 magnetic polarity change, the rotor pole-to-pole counter is stopped and the value outputted to the controller and then the rotor pole-to-pole counter is re-started. In Step 6, Phase D is energized until the controller counted to a time equal to y of the most-recent pole-to-pole count. Then Phase D is de-energized and Phase A is energized. In Step 7, Phase A is energized until the controller counted to a time equal to z of the most-recent pole-to-pole count. Then Phase A is de-energized and Phase B is energized. In Step 8, Phase B is energized and when the sensor 30, detects a rotor 20 magnetic polarity change, the rotor pole-to-pole counter is stopped and the value outputted to the controller and then the rotor pole-to-pole counter is re-started. Steps 3 through 8 may now be continuously repeated with the two exceptions that y value count may now be used in Step 3 (w may be used only in the first Step 3) and that z value count may be now used in Step 4 (x may be used only in the first Step 4). In this exemplary embodiment, the variables w, x, y and z are a function of the physical placement of the rotor sensor relative to the physical location of the stator poles and have a fractional relationship to the rotor pole-to-pole time count value.

Figure 12:
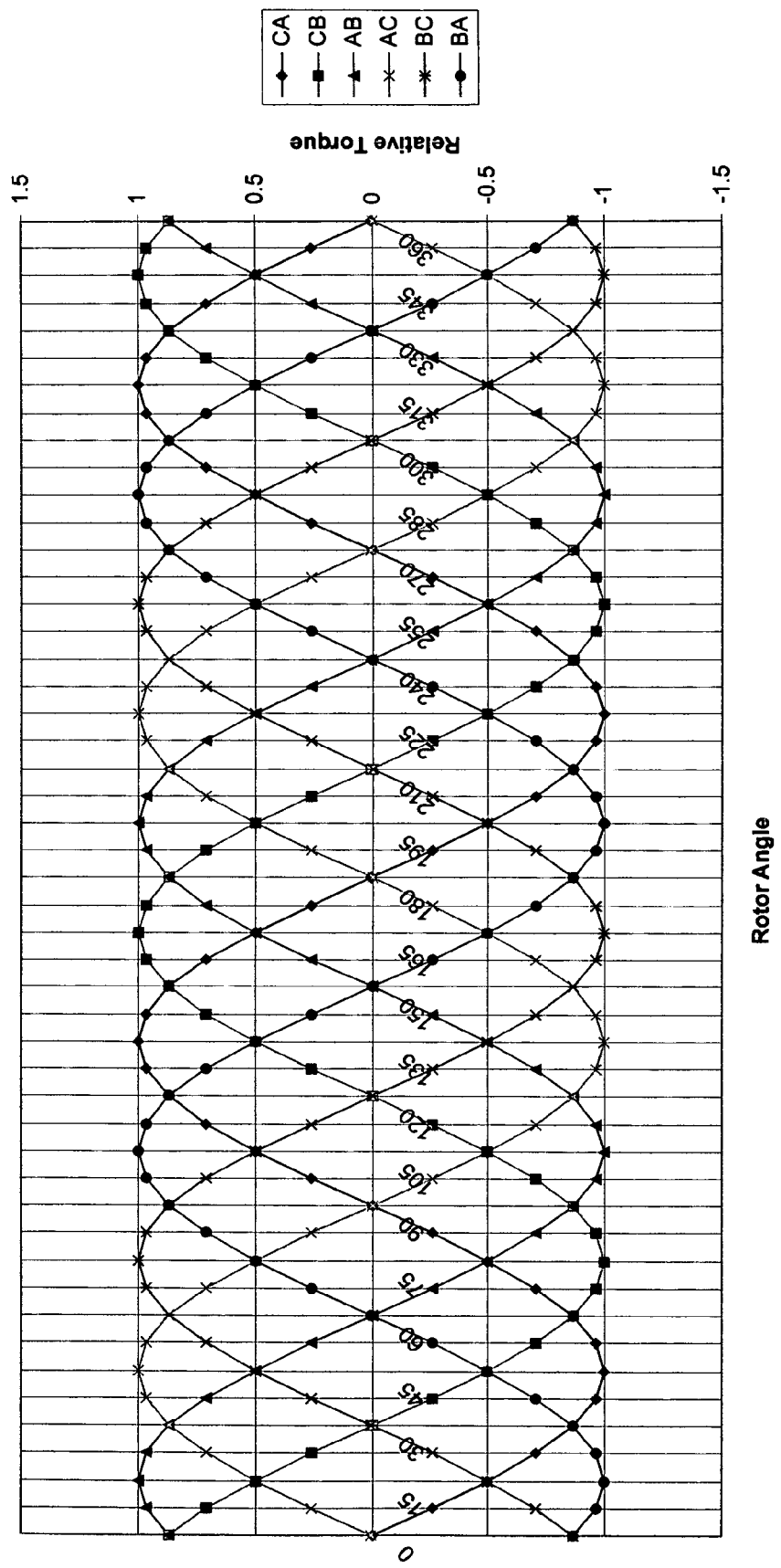
FIG. 12 is a graph showing relative torque of different phases versus angle of rotation of a 3-phase bipolar motor.

Now referencing FIG. 12, the phase-torque versus rotor angle relationship of a 3-phase bipolar motor can be seen. This is based on the arbitrary reference selection as Phase CA set at rotational angle of 0°. This overlap of torque may be one reason that a 3-phase bipolar motor is more torque efficient than a 2-phase motor, as noted earlier. If Phase CA is set as the pre-defined alignment phase and energized so as to generate a South Pole, the rotor may move to and stop at rotational angle of 0°. Thus, at this point, the motor system may have motor with phase-torque relationship as shown in FIG. 12. As can be seen from this phase-torque relationship (after being aligned), the torque generated by de-energizing Phase CA and then energizing Phase AB may cause the rotor to move (rotate). And then, at 30°, if Phase AB is de-energized and Phase AC is energized, the rotor may continue to rotate. Note that one phase (Phase CB) was skipped between alignment with Phase CA and first rotation with Phase AB. This is because torque of Phase CB is already starting to decrease at angle location of 0° and so starting may be better with Phase AB. However, once rotating Phase CB is never skipped again and thus can continue to follow this de-energization/energization process.

Figure 13:
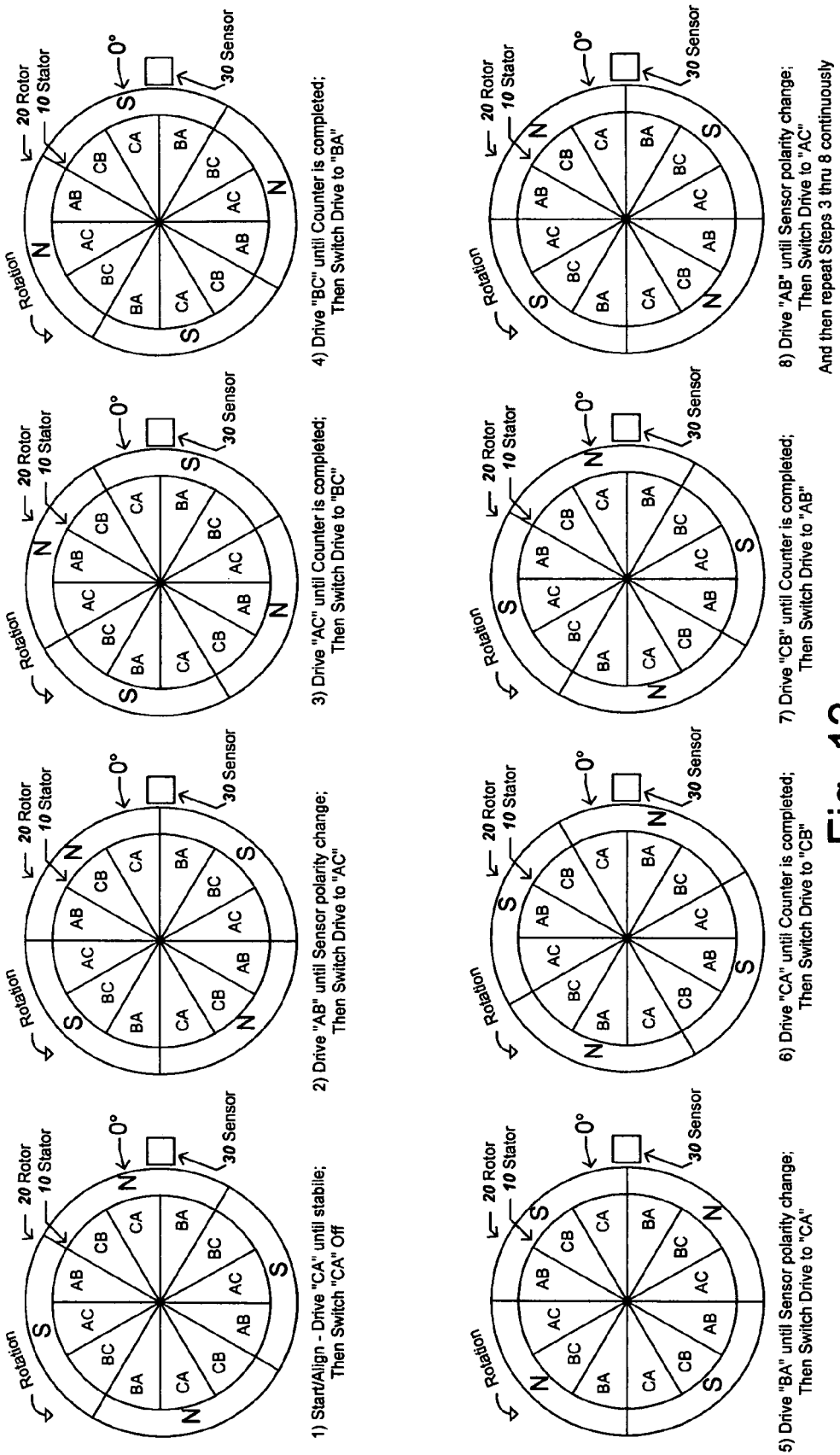
FIG. 13 is an exemplary version of controller/driver phase states versus angle of rotation when the single-output rotor sensor 30 is rotationally centered between stator poles in a 3-phase bipolar motor system.

Referencing FIG. 13, an exemplary embodiment will be described via the start-up and rotational process of a 3-phase bipolar stator 10 with a 2-pole-pair permanent-magnet rotor 20 and a single rotor sensor 30 is physically located within the useable magnetic field intensity of the rotor at a rotation angle of the rotor that is centered between the physical structures of two stator poles. In Step 1, Phase CA of the stator 10 is energized as an alignment phase and the rotor 20 moves to and stops at 0°, then Phase CA is de-energized. In Step 2, Phase AB is energized and the rotor pole-to-pole counter is started. When the sensor 30, detects a rotor 20 magnetic polarity change, Phase AB is de-energized, Phase AC is energized and the rotor pole-to-pole counter is stopped and the value outputted to the controller and then the rotor pole-to-pole counter is re-started. In Step 3, Phase AC is energized until the controller counted to a time equal to 1 of the most-recent pole-to-pole count. Then Phase AC is de-energized and Phase BC is energized. In Step 4, Phase BC is energized until the controller counted to a time equal to 1 of the most-recent pole-to-pole count. Then Phase BC is de-energized and Phase BA is energized. In Step 5, Phase BA is energized and when the sensor 30 detects a rotor 20 magnetic polarity change, Phase BA is de-energized, Phase CA is energized and the rotor pole-to-pole counter is stopped and the value outputted to the controller and then the rotor pole-to-pole counter is re-started. In Step 6, Phase CA is energized until the controller counted to a time equal to ⅓ of the most-recent pole-to-pole count. Then Phase CA is de-energized and Phase CB is energized. In Step 7, Phase CB is energized until the controller counted to a time equal to ⅓ of the most-recent pole-to-pole count. Then Phase CB is de-energized and Phase AB is energized. In Step 8, Phase AB is energized and when the sensor 30 detects a rotor 20 magnetic polarity change, Phase AB is de-energized, Phase AC is energized and the rotor pole-to-pole counter is stopped and the value outputted to the controller and then the rotor pole-to-pole counter is re-started. Steps 3 through 8 are now continuously repeated with the two exceptions that ⅓ value count may now be used in Step 3 (1 may be used only in the first Step 3) and that ⅓ value count may now be used in Step 4 (1 may be used only in the first Step 4).

Referencing FIG. 14, an exemplary embodiment will be described via the start-up and rotational process of a 3-phase bipolar stator 10 with a 2-pole-pair permanent-magnet rotor 20 and a single rotor sensor 30 is physically located within the useable magnetic field intensity of the rotor at a rotation angle of the rotor that is centered directly in-line with the physical structure of one stator pole. In Step 1, Phase CA of the stator 10 is energized as an alignment phase and the rotor 20 moves to and stops at 0°, then Phase CA is de-energized. In Step 2, Phase AB is energized and the rotor pole-to-pole counter is started. When the sensor 30, detects a rotor 20 magnetic polarity change, Phase AB is de-energized, Phase AC is energized and the rotor pole-to-pole counter is stopped and the value outputted to the controller and then the rotor pole-to-pole counter is re-started. In Step 3, Phase AC is energized until the controller counted to a time equal to 1 of the most-recent pole-to-pole count. Then Phase AC is de-energized and Phase BC is energized. In Step 4, Phase BC is energized until the controller counted to a time equal to 1 of the most-recent pole-to-pole count. Then Phase BC is de-energized and Phase BA is energized. In Step 5, Phase BA is energized and when the sensor 30 detects a rotor 20 magnetic polarity change, Phase BA is de-energized, Phase CA is energized and the rotor pole-to-pole counter is stopped and the value outputted to the controller and then the rotor pole-to-pole counter is re-started. In Step 6, Phase CA is energized until the controller counted to a time equal to ⅓ of the most-recent pole-to-pole count. Then Phase CA is de-energized and Phase CB is energized. In Step 7, Phase CB is energized until the controller counted to a time equal to ⅓ of the most-recent pole-to-pole count. Then Phase CB is de-energized and Phase AB is energized. In Step 8, Phase AB is energized and when the sensor 30 detects a rotor 20 magnetic polarity change, Phase AB is de-energized, Phase AC is energized and the rotor pole-to-pole counter is stopped and the value outputted to the controller and then the rotor pole-to-pole counter is re-started. Steps 3 through 8 are now continuously repeated with the two exceptions that ⅓ value count may now be used in Step 3 (1 may be used only in the first Step 3) and that ⅓ value count may now be used in Step 4 (1 may be used only in the first Step 4).

Figure 15:
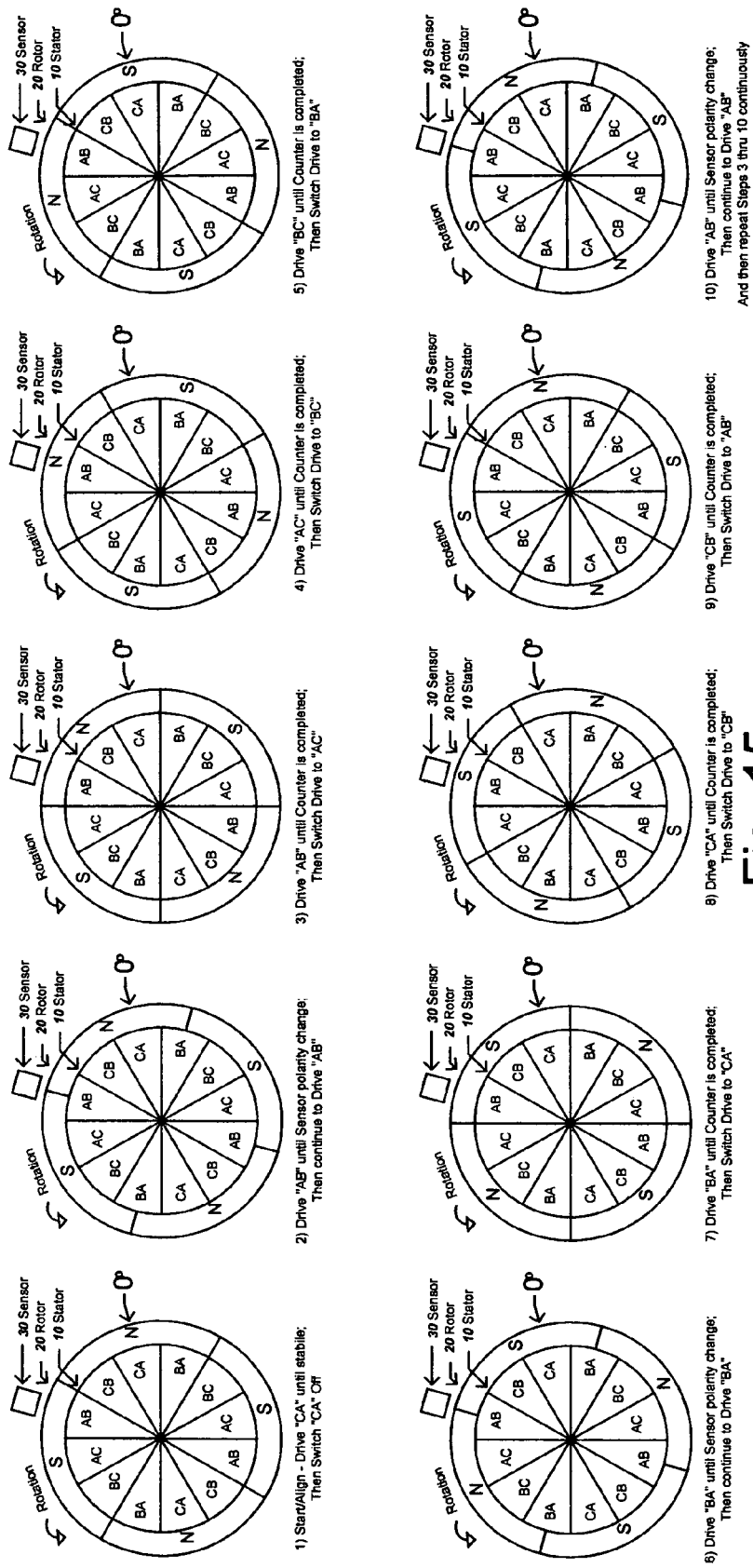
FIG. 15 is an exemplary version of controller/driver phase states versus angle of rotation when the single-output rotor sensor 30 is rotationally placed at an arbitrary angle between stator poles in a 3-phase bipolar motor system.

Referencing FIG. 15, an exemplary embodiment will be described via the start-up and rotational process of a 3-phase bipolar stator 10 with a 2-pole-pair permanent-magnet rotor 20 and a single rotor sensor 30 is physically located within the useable magnetic field intensity of the rotor at a rotation angle of the rotor that is arbitrarily chosen between the physical structures of two stator poles. In Step 1, Phase CA of the stator 10 is energized as an alignment phase and the rotor 20 moves to and stops at 0°, then Phase CA is de-energized. In Step 2, Phase AB is energized and the rotor pole-to-pole counter is started. When the sensor 30, detects a rotor 20 magnetic polarity change the rotor pole-to-pole counter is stopped and the value outputted to the controller and then the rotor pole-to-pole counter is re-started. In Step 3, Phase AB is energized until the controller counted to a time equal to w of the most-recent pole-to-pole count. Then Phase AB is de-energized and Phase AC is energized. In Step 4, Phase AC is energized until the controller counted to a time equal to x of the most-recent pole-to-pole count. Then Phase AC is de-energized and Phase BC is energized. In Step 5, Phase BC is energized until the controller counted to a time equal to x of the most-recent pole-to-pole count. Then Phase BC is de-energized and Phase BA is energized. In Step 6, Phase BA is energized and when the sensor 30 detects a rotor 20 magnetic polarity change, the rotor pole-to-pole counter is stopped and the value outputted to the controller and then the rotor pole-to-pole counter is re-started. In Step 7, Phase BA is energized until the controller counted to a time equal to y of the most-recent pole-to-pole count. Then Phase BA is de-energized and Phase CA is energized. In Step 8, Phase CA is energized until the controller counted to a time equal to z of the most-recent pole-to-pole count. Then Phase CA is de-energized and Phase CB is energized. In Step 9, Phase CB is energized until the controller counted to a time equal to z of the most-recent pole-to-pole count. Then Phase CB is de-energized and Phase AB is energized. In Step 10, Phase AB is energized and when the sensor 30 detects a rotor 20 magnetic polarity change the rotor pole-to-pole counter is stopped and the value outputted to the controller and then the rotor pole-to-pole counter is re-started. Steps 3 through 10 are now continuously repeated with the two exceptions that y value count may now be used in Step 3 (w may be used only in the first Step 3) and that z value count may now be used in Step 4 (x may be used only in the first Step 4). In this exemplary embodiment, the variables w, x, y and z are a function of the physical placement of the rotor sensor relative to the physical location of the stator poles and have a fractional relationship to the rotor pole-to-pole time count value.

Now it is important to re-iterate the adaptability of this system to many motors and motor system applications. As shown above via the many examples above (which does not mean to limit, but only to demonstrate the adaptability) of motor type and sensor placements, the system is very adaptable. Other Step processes (which have not been shown as examples) may be utilized in conjunction with this new invention. Note also that the selection to align to Phase C or Phase D or Phase CA is arbitrary also. The new invention is adaptable to many other selections. The system is also adaptable to other multiphase motors also (not limited to 3-phase unipolar or 4-phase unipolar or 3-phase bipolar). Modifications and substitutions by one of ordinary skill in the art are considered to be within the scope of the present invention, which is not to be limited except by the following claims.

The invention claimed is:

1. A system of controlling a multiphase motor via electronic commutation of the multiple phases comprising:
   (a) a multiphase winding stator;
   (b) a rotor with a magnetic pole-pair count less than the number of driveable phases of the stator;
   (c) a rotor sensor;
   (d) a rotor pole-to-pole time counter; and
   (e) an electronic controller and driver that energizes the stator's multiphase windings wherein the electronic controller and driver utilizes a combination of the last several time count outputs of the rotor pole-to-pole time counter combined with the known present energized state and the output of the rotor sensor to determine when to commutate phases.

2. The system in claim 1 wherein the rotor sensor is a Hall effect sensor whose output polarity is a function of the magnetic field polarity of the rotor magnetic poles as the rotor magnetic poles rotate by the rotor sensor.

3. The system in claim 1 wherein the rotor sensor is an optical sensor whose output polarity is a function of a measured intensity of light that hits identifiable surfaces of the rotor as the rotor magnetic poles rotate by the sensor and the identifiable surface are in approximate alignment to the magnetic pole-pairs of the rotor and equal in count to the magnetic pole-pairs of the rotor.

4. The system in claim 2 wherein the rotor sensor is physically located within a magnetic field intensity of the rotor at a rotation angle of the rotor that is centered between the physical structures of two stator poles.

5. The system in claim 1 wherein the electronic controller and driver periodically utilizes the single last time count output of the rotor pole-to-pole time counter combined with the known present energized state and the output of the rotor sensor to determine when to commutate phases.

6. The system in claim 2 wherein the rotor sensor is physically located within a magnetic field intensity of the rotor at a rotation angle of the rotor that is centered directly in-line with the physical structure of one stator pole.

7. The system in claim 2 wherein the rotor sensor is physically located within a magnetic field intensity of the rotor at a rotation angle of the rotor that is located between the physical structures of two stator poles.

8. The system in claim 1 in which electronic controller and driver once a steady-state motor condition is achieved utilizes the single last time count output of the rotor pole-to-pole time counter combined with the known present energized state and the output of the rotor sensor to determine when to commutate phases.

9. The system in claim 1 wherein the signal-output rotor sensor, the rotor pole-to-pole time counter and the electronic controller and driver are separate devices.

10. The system in claim 1 wherein the signal-output rotor sensor, the rotor pole-to-pole time counter and the electronic controller and driver are fully integrated into one integrated circuit (IC) device.

11. The system in claim 1 wherein the electronic controller and driver includes an acceleration compensator that compensates for rotor acceleration during motor speed ramp-up time for timed phase commutations during system acceleration phase.

12. The system in claim 1 wherein the electronic controller and driver includes a deceleration compensator that compensates for rotor deceleration during motor speed ramp-down time for timed phase commutations during system deceleration phase.

13. The system in claim 1 wherein an acceleration/deceleration compensator includes a voltage supply monitor to determine motor status.

14. The system in claim 1 wherein the rotor pole-to-pole time counter measures time via a system clock.

15. A system of controlling commutation of a multiphase motor comprising:
   (a) a single rotor sensor for determine the position of a rotor;
   (b) a time counter; and
   (c) a motor controller that selectively energizes multiphase windings of a stator wherein the motor controller utilizes a combination of the last several time count outputs of the rotor pole-to-pole time counter combined with a known present energized state and the output of the rotor sensor to determine when to commutate phases.

16. The system for controlling commutation of a multiphase motor of claim 15 wherein the single rotor sensor is arbitrarily positioned about a rotor of the multiphase motor.

17. A method of controlling commutation of a multiphase motor comprising the action of:
   determining a current position of a rotor of the multiphase motor by a single rotor sensor;
   determining the difference between a prior position of the rotor of the multiphase motor and the current position;
   determining the proper commutation of the multiphase motor based on the difference and time elapsed between the prior position and current position.

18. The method of controlling commutation of a multiphase motor of claim 17 further comprising the action of:
   arbitrarily positioning the single rotor sensor about the rotor of the multiphase motor.

19. The method of controlling commutation of a multiphase motor of claim 17 further comprising the action of:
   determining a status of the motor.

20. A system of controlling a multiphase motor via electronic commutation of the multiple phases comprising:
   (a) a multiphase winding stator;
   (b) a rotor with a magnetic pole-pair count less than the number of driveable phases of the stator;
   (c) a rotor sensor;
   (d) a rotor pole-to-pole time counter; and
   (e) an electronic controller and driver that energizes the stator's multiphase windings based on a known prior phase state, an output of the rotor sensor, and a time count value of the rotor pole-to-pole time counter wherein the electronic controller and driver includes an acceleration compensator that compensates for rotor acceleration during motor speed ramp-up time for timed phase commutations during system acceleration phase.

21. A system of controlling a multiphase motor via electronic commutation of the multiple phases comprising:
   (a) a multiphase winding stator;
   (b) a rotor with a magnetic pole-pair count less than the number of driveable phases of the stator;
   (c) a rotor sensor;
   (d) a rotor pole-to-pole time counter; and
   (e) an electronic controller and driver that energizes the stator's multiphase windings based on a known prior phase state, an output of the rotor sensor, and a time count value of the rotor pole-to-pole time counter wherein the electronic controller and driver includes a deceleration compensator that compensates for rotor deceleration during motor speed ramp-down time for timed phase commutations during system deceleration phase.

22. A system of controlling a multiphase motor via electronic commutation of the multiple phases comprising:
(a) a multiphase winding stator;
(b) a rotor with a magnetic pole-pair count less than the number of driveable phases of the stator;
(c) a rotor sensor;
(d) a rotor pole-to-pole time counter; and
(e) an electronic controller and driver that energizes the stator's multiphase windings based on a known prior phase state, an output of the rotor sensor, and a time count value of the rotor pole-to-pole time counter wherein an acceleration/deceleration compensator for rotor acceleration/deceleration includes a voltage supply monitor to determine motor status.

* * * * *